United States Patent
Tamagawa et al.

[19]

[11] Patent Number: 6,129,643
[45] Date of Patent: Oct. 10, 2000

[54] VARIABLE DIAMETER PULLEY

[75] Inventors: Takao Tamagawa; Toyohisa Asaji; Shinji Yasuhara; Yasuhiko Hasuda, all of Osaka, Japan

[73] Assignee: Koyo Seiko Co., Ltd., Osaka, Japan

[21] Appl. No.: 09/142,378

[22] PCT Filed: Mar. 7, 1997

[86] PCT No.: PCT/JP97/00713

§ 371 Date: Sep. 4, 1998

§ 102(e) Date: Sep. 4, 1998

[87] PCT Pub. No.: WO97/33105

PCT Pub. Date: Sep. 12, 1997

[30]    Foreign Application Priority Data

Mar. 8, 1996 [JP] Japan ................................ 8-051929
Feb. 3, 1997 [JP] Japan ................................ 9-020781

[51] Int. Cl.[7] ............................. F16H 55/56; F16H 63/00
[52] U.S. Cl. ................................. 474/8; 474/41; 474/35; 474/10; 474/46
[58] Field of Search ............................. 474/17, 28, 10, 474/30, 40, 37, 41–44, 21, 14, 70, 8, 35

[56]              References Cited

U.S. PATENT DOCUMENTS

| 3,034,366 | 5/1962 | Tann ............................................. 474/42 |
| 4,187,732 | 2/1980 | Takagi et al. ............................... 474/37 |
| 4,631,042 | 12/1986 | Rattunde ..................................... 474/8 |

FOREIGN PATENT DOCUMENTS

| 36-24519 | 9/1961 | Japan . |
| 55-149650 | 10/1980 | Japan . |
| 57-97948 | 6/1982 | Japan . |
| 57-171447 | 10/1982 | Japan . |
| 140663 | 6/1986 | Japan ....................................... 474/28 |
| 61-252956 | 11/1986 | Japan . |
| 63-126653 | 8/1988 | Japan . |
| 63-251655 | 10/1988 | Japan . |
| 1-63864 | 4/1989 | Japan . |
| 6-73512 | 10/1994 | Japan . |

*Primary Examiner*—David A. Bucci
*Assistant Examiner*—Marcus Charles
*Attorney, Agent, or Firm*—Rabin & Champagne, P.C.

[57]              ABSTRACT

A variable diameter pulley comprises a pair of pulley main bodies (18, 19) connected to a rotating shaft (15), and a power transmission ring (20) interposed between the pulley main bodies. A belt (2) is passed around an outer periphery of the power transmission ring (20). The power transmission ring (20) is made eccentric relative to an axis (15a) of the rotating shaft (15) so as to be varied in its contact diameter (D). Both pulley main bodies (18, 19) are threadedly connected to the rotating shaft (15) by a torque cam mechanism (T) composed of a pair of thread connection mechanisms, which are inversely threaded to each other. Torque for effecting rotation of the respective pulley main bodies (18, 19) relative to the rotating shaft (15) is converted into a force, which causes both pulley main bodies (18, 19) to approach each other in equal amounts of stroke.

23 Claims, 21 Drawing Sheets

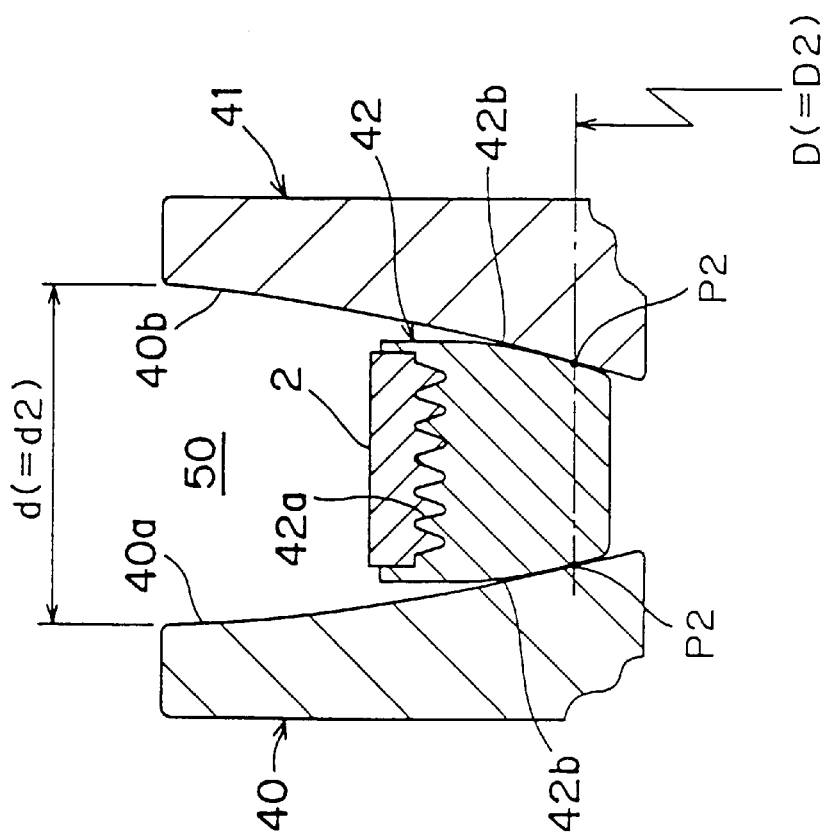
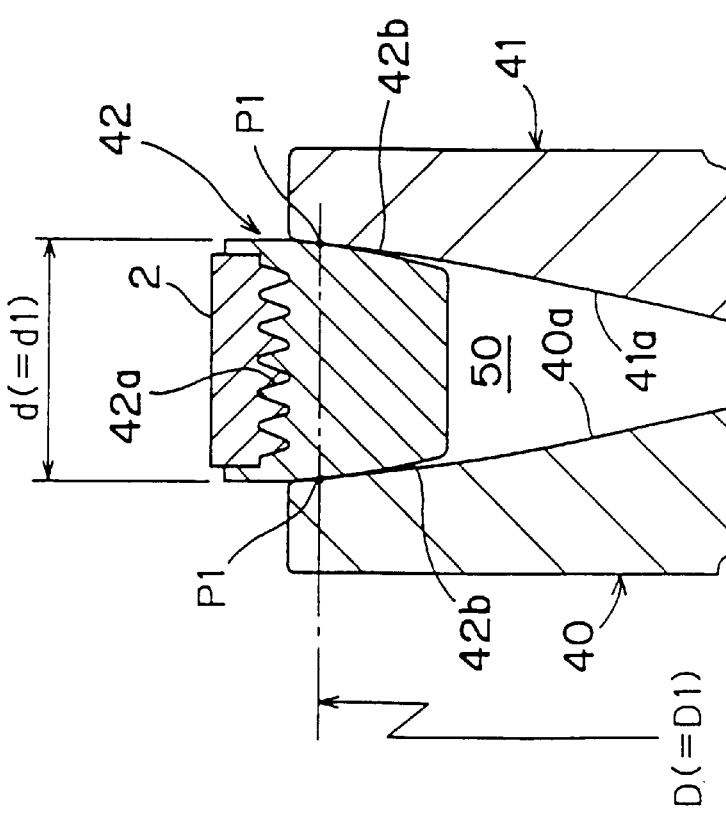

F I G. 15
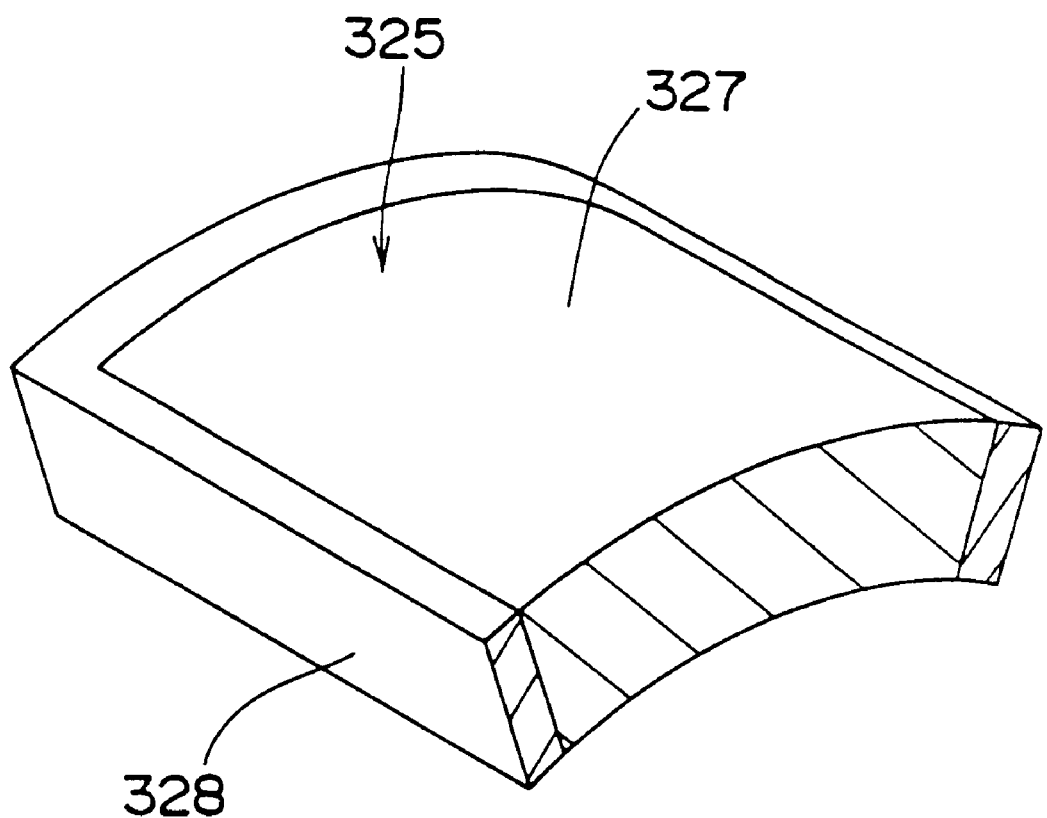

F I G. 16
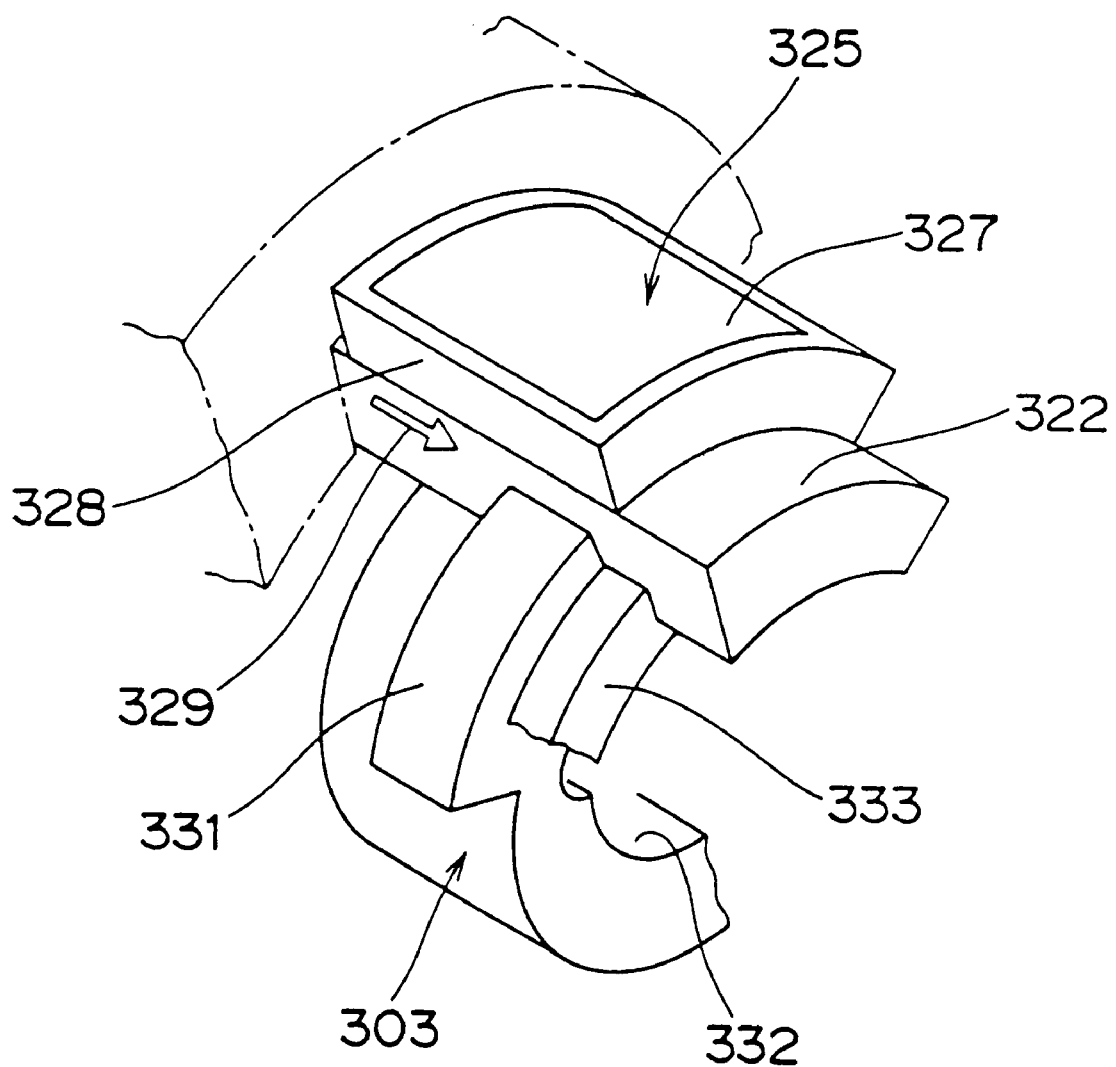

FIG. 20
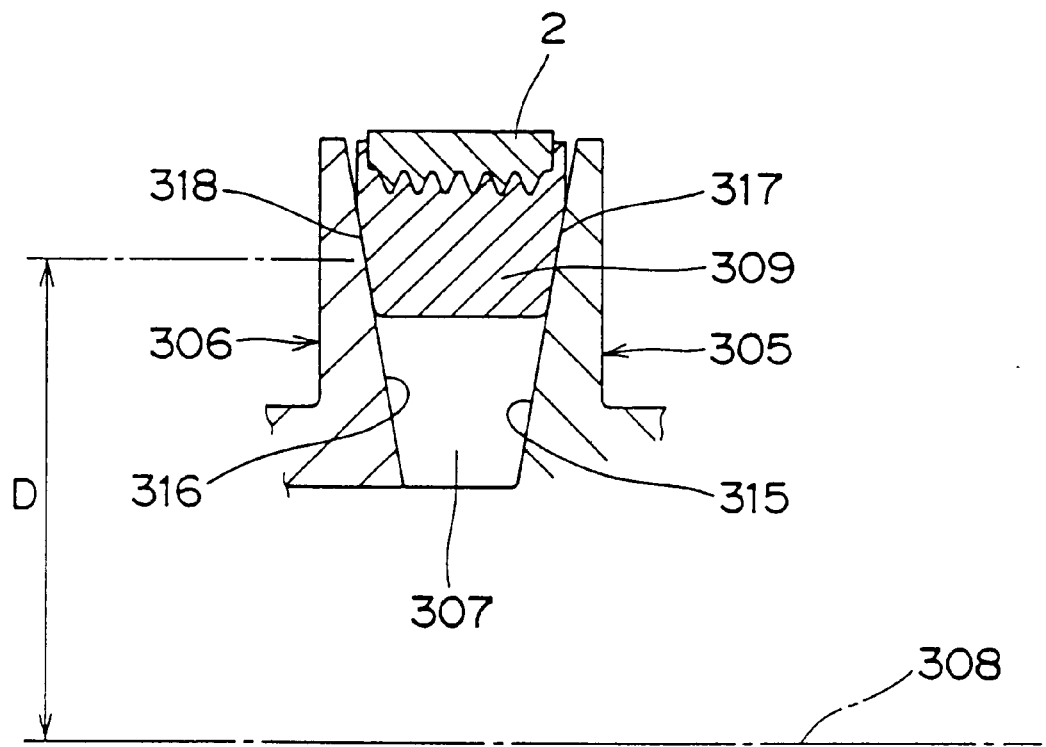
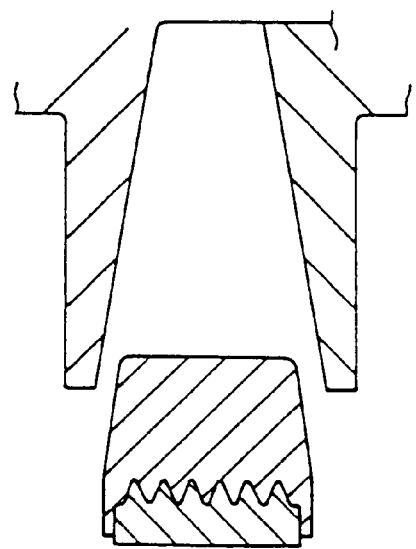

VARIABLE DIAMETER PULLEY

TECHNICAL FIELD

The present invention relates to a variable diameter pulley which is capable of varying its effective radius with respect to a belt stretched therearound.

BACKGROUND ART

Conventionally, belt transmission systems are employed for driving auxiliary systems such as a car compressor and an oil pump of an automobile.

Such a belt transmission system is adapted to transmit a driving force from a crank shaft of an engine to an auxiliary system through pulleys and a belt at a predetermined transmission ratio. Therefore, the rotational speed of the auxiliary system is increased as the rotational speed of the crank shaft is increased. The operational efficiency of the auxiliary system is generally increased with the increase in the rotational speed thereof, but the efficiency tends to decrease when the rotational speed exceeds a predetermined level.

Therefore, driving the auxiliary system at a rotational speed higher than a required level leads to wasteful energy consumption, and adversely effects the durability of the auxiliary system. In view of this, there has been proposed a belt transmission system which is capable of adjusting the rotation speed of an auxiliary system.

Such a belt transmission system is disclosed, for example, in Japanese Unexamined Patent Publication No. 2-500261 (W). The belt transmission system according to this publication employs a variable diameter pulley which is capable of varying the contact diameter of a belt stretched therearound.

The variable diameter pulley includes a multiplicity of belt engagement bars arranged in a circular pattern around a rotation shaft thereof and resiliently and radially outwardly biased by biasing means. The diameter of the circular pattern is equivalent to the effective diameter of the variable diameter pulley. The multiplicity of belt engagement bars are radially inwardly moved in unison in resistance to a biasing force applied by the biasing means to vary the effective radius of the variable diameter pulley (the contact radius of the belt).

More specifically, the variable diameter pulley has a pair of rotation plates opposed to each other and respectively formed with a multiplicity of grooves extending radially and spirally in opposite directions. Opposite ends of the respective belt engagement bars are supported by corresponding grooves of the rotation plates. Thus, the effective diameter can be varied with the respective belt engagement bars kept in the circular pattern as the rotation plates are relatively rotated. Used as the biasing means is a twist coil spring which is disposed between the rotation plates and adapted to rotatively bias the rotation plates toward each other in such directions that the effective diameter is increased.

The variable diameter pulley according to the aforesaid publication has a large number of components because of the provision of the multiplicity of belt engagement bars. In addition, these belt engagement bars should be kept in the circular pattern for varying the diameter of the circular pattern. Therefore, the construction of the variable diameter pulley is complicated.

Further, when the multiplicity of belt engagement bars are moved to vary the diameter of the circular pattern, frictional resistance occurs between the opposite ends of the respective belt engagement bars and the corresponding radial grooves. Since the multiplicity of belt engagement bars each have two friction points, the variable diameter pulley has a great number of friction points. As a result, the variable diameter pulley suffers a great frictional resistance, making it difficult to smoothly change the rotation speed.

The diameter of the circular pattern depends on radial positions of the belt engagement bars at which a force exerted by the belt for radially inwardly biasing the belt engagement bars is balanced with a biasing force of the twist coil spring as the biasing means. Therefore, where the biasing force is small, the effective diameter of the variable diameter pulley may fluctuate in sensitive response to a torque fluctuation. The fluctuation of the effective diameter of the variable diameter pulley could be prevented by increasing the biasing force. However, this may lead to an increase in frictional torque, resulting in a less smooth change of the rotational speed and a greater loss of transmission torque.

It is an object of the present invention to provide a variable diameter pulley which features a simple construction and smooth change of the rotational speed, and is less sensitive to the torque fluctuation.

DISCLOSURE OF INVENTION

In accordance with a preferable mode of the present invention to achieve the aforesaid object, there is provided a variable diameter pulley which is capable of varying its effective radius with respect to a belt stretched therearound and comprises: a pair of annular pulley main bodies fitted around a shaft rotating in a predetermined rotation direction; a pair of tapered torque transmission faces respectively formed on opposed surfaces of the pair of pulley main bodies and defining therebetween a retention groove for directly or indirectly holding the belt; first coupling means for coupling the pair of pulley main bodies to each other in a co-rotatable manner while permitting the pair of pulley main bodies to axially move relative to each other; biasing means for biasing the pair of pulley main bodies toward each other; and a pair of second coupling means for coupling the pair of pulley main bodies to the rotation shaft for torque transmission thereto, the pair of second coupling means including a pair of conversion mechanisms for converting rotational movements of the corresponding pulley main bodies relative to the rotation shaft into axial movements of the corresponding pulley main bodies so as to move the pair of pulley main bodies toward each other by equal stroke amounts.

In this mode, when a tensile force applied to a tensed portion of the belt is increased due to a torque fluctuation, such a force as to move the pulley main bodies away from each other is exerted on the pulley main bodies so that the tensed belt portion is moved radially inwardly of the pulley main bodies. On the other hand, the transmitted torque is converted into such a force as to move the pulley main bodies toward each other by the conversion mechanisms and, therefore, the force acting to move the pulley main bodies away from each other is balanced with the force acting to move the pulley main bodies toward each other plus the biasing force of the biasing means. Thus, the effective radius of the variable diameter pulley is not changed even if there is a torque fluctuation not higher than a certain level. In the conventional case where the force acting to move the pulley main bodies toward each other is provided only by the biasing force, the friction loss tends to undesirably increase. In accordance with the present invention, however, the conversion mechanisms properly apply the force to move the pulley main bodies toward each other according to the magnitude of a load torque. Therefore, the biasing force to be applied by the biasing means can be reduced, thereby minimizing the friction loss.

The conventional variable diameter pulley has a complicated construction with a lot of friction points in its belt supporting portion because the belt is supported by the plurality of belt engagement bars. The variable diameter pulley of the present invention, however, has a simplified construction with a smaller number of components and a smaller number of friction points because the pair of annular pulley main bodies are employed as the belt supporting means.

Further, since the conversion mechanisms of the present invention move the pulley main bodies toward each other by equal stroke amounts, the widthwise center line of the belt (the center line along the traveling direction of the belt) is kept constant even if the effective radius of the variable diameter pulley varies.

It is herein understood that the tapered torque transmission faces include not only linearly inclined faces but also curvedly inclined faces.

In accordance with another preferable mode of the present invention, the first coupling means includes engagement projections and engagement recesses formed on the respective pulley main bodies, and the engagement projection and engagement recess formed on one of the pulley main bodies are respectively engaged with the engagement recess and engagement projection formed on the other pulley main body.

In this mode, the pulley main bodies also serve as the coupling means. Therefore, the construction of the variable diameter pulley can be simplified with a smaller number of components in comparison with a case where additional coupling means are employed.

In accordance with still another preferable mode of the present invention, the variable diameter pulley further includes an annular power transmission member having an outer circumferential surface on which the belt is wrapped. The annular power transmission member is held by the pair of torque transmission faces in a state where the power transmission member is movable eccentrically with respect to an axis of the pair of pulley main bodies, whereby a torque is transmitted between the belt and the pair of pulley main bodies via the power transmission member.

In this mode, a flat belt rather than a V-shaped belt can be used as the belt. Further, the power transmission member can be made of a different material from that of the belt. Where the belt is made of a rubber, for example, a resin can be employed as the material for the power transmission member. The power transmission member of the resin is less liable to seize on the pulley main bodies, and has a greater friction coefficient with respect to the pulley main bodies.

The variable diameter pulley preferably further includes an inertia member movable relative to the power transmission member and resilient support means for resiliently supporting the inertia member with respect to the power transmission member. In this case, the inertia member and the resilient support means function as a dynamic damper for attenuating vibration of the power transmission member. Thus, the vibration of the power transmission member can drastically be reduced. Usable as the resilient support member are a resilient member such as made of a rubber, a resin or a metal, and oil and grease having viscoelastic properties.

In accordance with a further preferable mode of the present invention, the biasing means includes a resilient member provided in a housing space defined between the rotation shaft and the pair of pulley main bodies.

In this mode, the size of the resilient member can be reduced in comparison with a case where a resilient member as the biasing means is provided on a lateral side of the pulley main bodies. Since the resilient member is provided inwardly of the pulley main bodies, the resilient member is less susceptible to invasion of foreign matter such as dust or water. Therefore, aging of the resilient member can be prevented.

In accordance with still another preferable mode of the present invention, the pair of pulley main bodies respectively have portions extending from opposed sides thereof in opposite directions, and the resilient member presses the oppositely extending portions away from each other to bias the pair of pulley main bodies toward each other.

In this mode, the respective pulley main bodies are pressed by equal forces. Therefore, the pulley main bodies apply equal forces to hold the belt or the power transmission member therebetween. Since the stroke of the resilient member can be equated with the sum of the lengths of the strokes of the pulley main bodies, the force to be applied by the resilient member for pressing the pulley main bodies can be reduced to one half that required in a case where the resilient member is adapted to press only one of the pulley main bodies. Therefore, the size of the resilient member can further be reduced.

BRIEF DESCRIPTION OF DRAWINGS

FIGS. 8A and 8B are schematic sectional views illustrating major portions of a variable diameter pulley according to a third embodiment of the present invention, particularly, FIG. 8A showing a state where the pulley has the maximum contact radius and FIG. 8B showing a state where the pulley has the minimum contact radius;

FIG. 15 is a partially broken perspective view illustrating the guide member of the variable diameter pulley of FIG. 11;

FIG. 16 is a schematic perspective view illustrating a state where the guide member and a coupling member are combined with the engagement projection of the pulley main body of the variable diameter pulley of FIG. 11;

FIG. 20 is a schematic vertical sectional view illustrating the variable diameter pulley of FIG. 11, which assumes a state where it has the minimum effective radius.

BEST MODE FOR CARRYING OUT THE INVENTION

Embodiments of the present invention will hereinafter be described in which only a driving pulley in a belt-driven engine auxiliary system is employed as a variable diameter pulley. However, one or plural variable diameter pulleys may be employed as driven pulleys in a single system and, in such a case, it is not necessary to use a variable diameter pulley as the driving pulley.

First Embodiment

Figure 1:
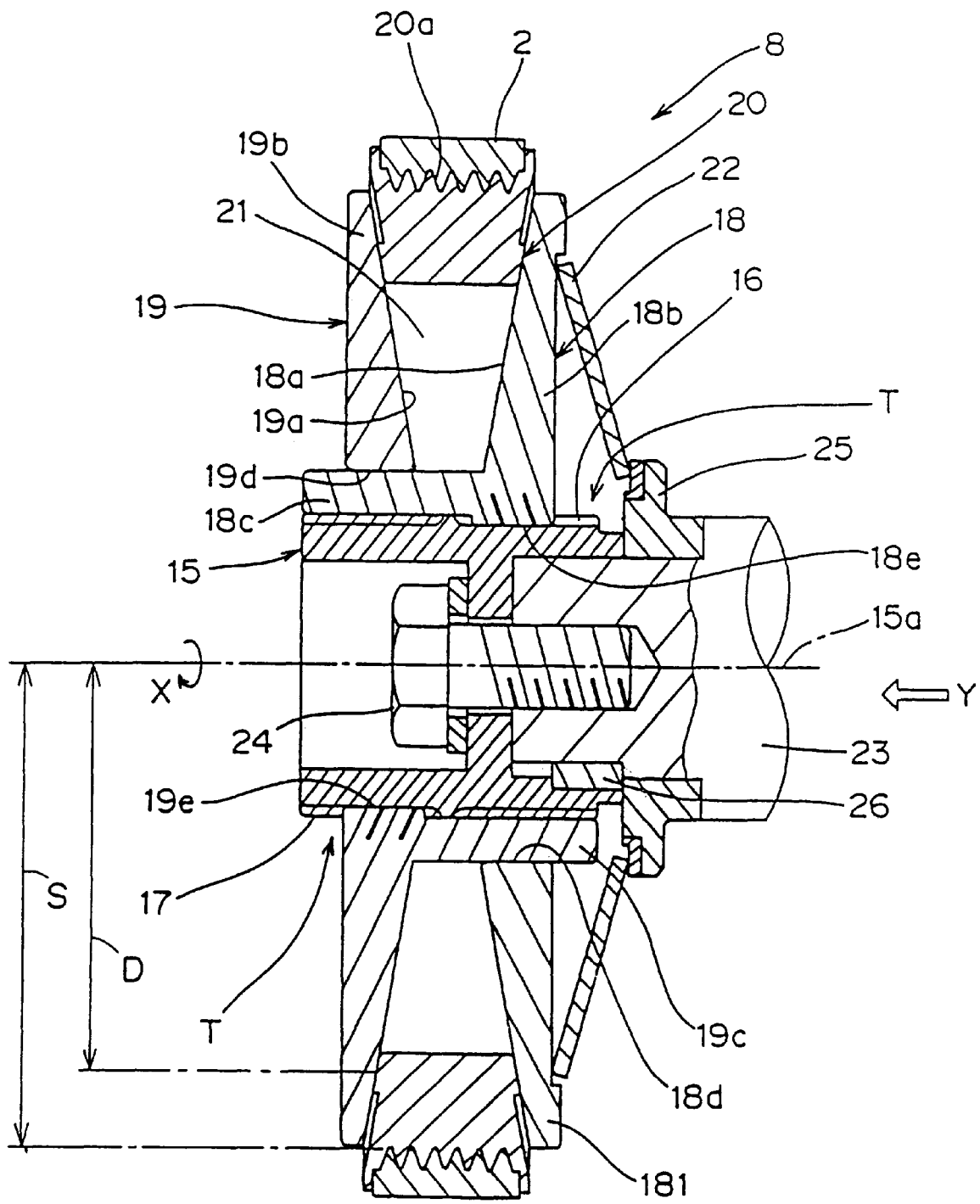
FIG. 1 is a vertical sectional view illustrating a variable diameter pulley according to a first embodiment of the present invention, which assumes a state where it has the maximum contact radius.
Figure 2:
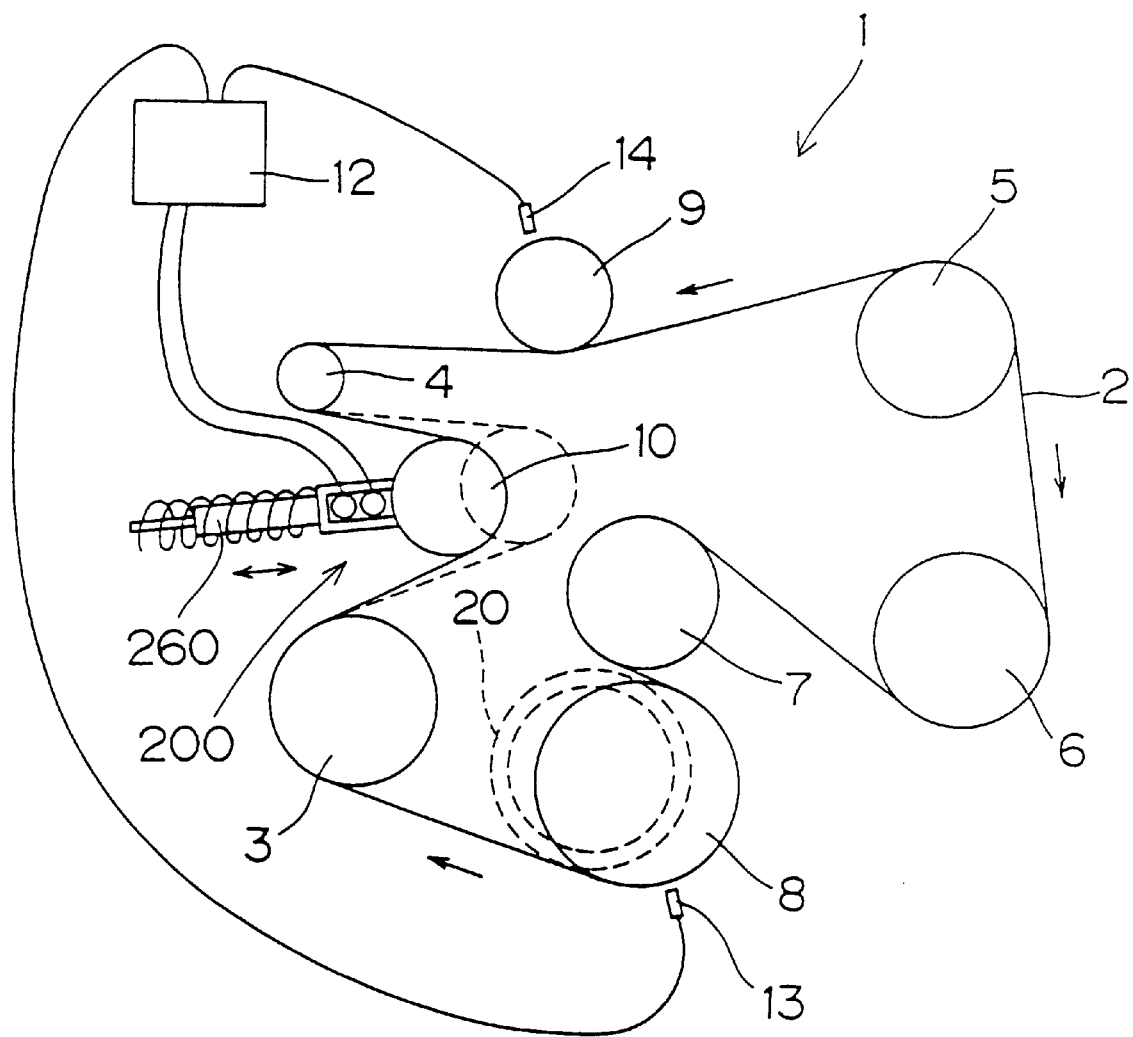
FIG. 2 is a schematic diagram illustrating a belt transmission system employing the variable diameter pulley of FIG. 1 for driving an engine auxiliary system.

With reference to FIGS. 1 to 5, a first preferred embodiment of the present invention will be described. FIG. 2 is a diagram schematically illustrating an overall belt transmission system associated with an engine including a series of auxiliary systems each driven via a belt 2 (these auxiliary systems are depicted by pulleys included therein).

These auxiliary systems are merely illustrative, and examples thereof include an air pump 3, an alternator 4, a compressor 5 for an air conditioner, a pump 6 for power steering and a water pump 7, which are driven by a variable diameter pulley 8 coupled to a crank shaft of the engine. A continuously variable transmission system 1 for transmitting a driving force to the respective auxiliary systems comprises the belt 2, the variable diameter pulley 8, the pulleys of the auxiliary systems 3 to 7, a tensioner 200 for regulating a transmission ratio of the variable diameter pulley 8, a hydraulic cylinder 260 as a fluid pressure actuator, a controller 12 and speed sensors 13 and 14. In FIG. 2, the concept of the tensioner 200 is illustrated schematically.

An idler pulley 9 is interposed between the pulley of the alternator 4 and the pulley of the air conditioner compressor 5, thereby properly adjusting angles (contact angles) of the belt 2 with respect to both pulleys.

A tensioner pulley 10 of the tensioner 200 for adjusting the tension of the belt 2 is disposed between the pulley of the air pump 3 and the pulley of the alternator 4. The tensioner pulley 10 can be shifted by the hydraulic cylinder 260 between a first position indicated by a solid line and a second position indicated by a broken line in FIG. 2. When the tensioner pulley is located in the first position, the variable diameter pulley 8 has the maximum contact radius (maximum effective radius) with respect to the belt 2. When the tensioner pulley is located in the second position, the variable diameter pulley 8 has the minimum contact radius (minimum effective radius). More specifically, a power transmission ring 20 is off-centered from the axis of the variable diameter pulley 8 as indicated by a broken line. The concept of the contact radius and the effective radius will be described in detail later.

Figure 3:
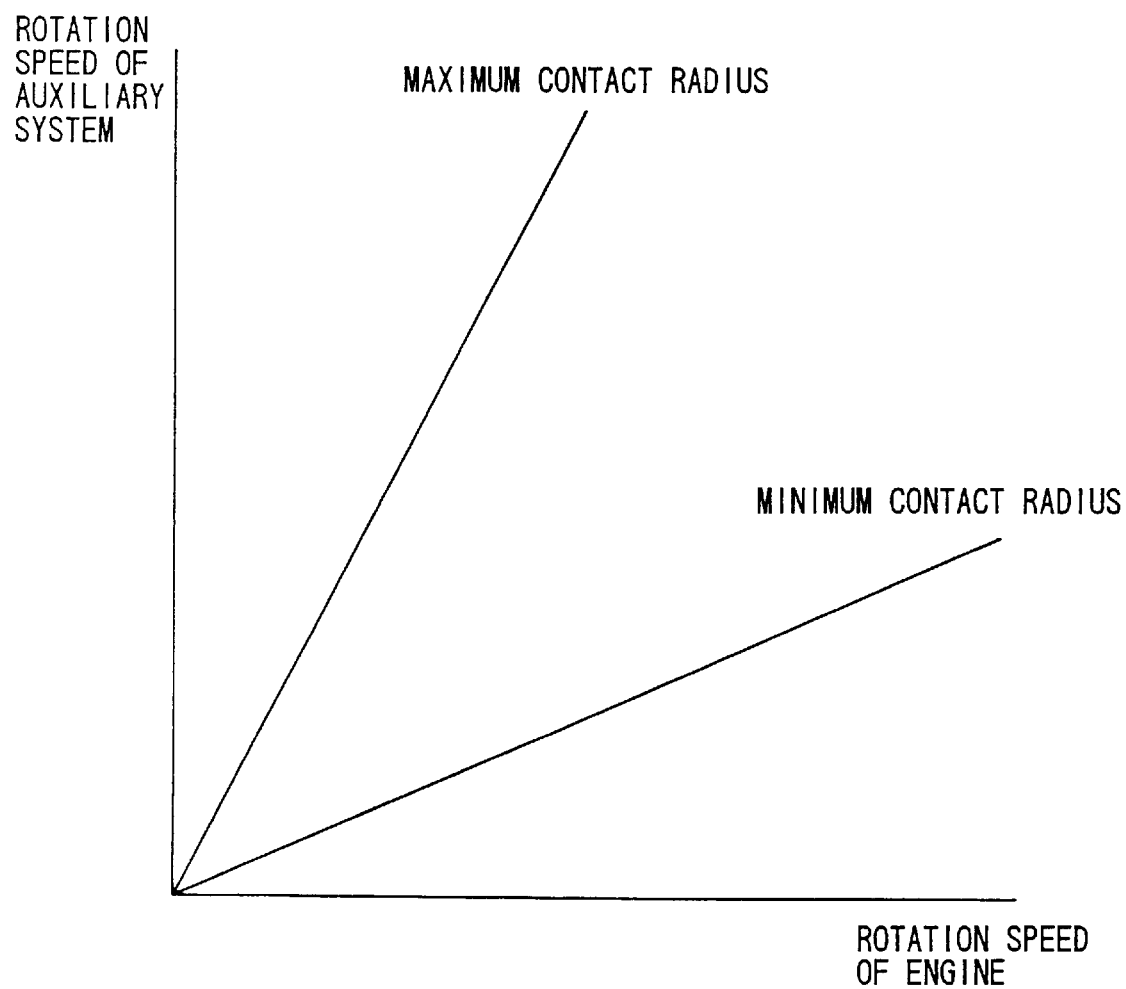
FIG. 3 shows a relationship between the rotational speed of an engine and the rotational speed of the auxiliary system.

Referring to FIG. 3, the continuously variable transmission is achieved by adjusting the contact radius (effective radius) to a desired level between the maximum and minimum levels. Alternatively, multi-level variable transmission may be employed, which is achieved by shifting the tensioner pulley 10 to any of a plurality of predetermined shift positions.

The motion of the tensioner pulley 10 is controlled by the controller 12. The controller 12 receives an output signal of the first speed sensor 13 as state quantity sensing means for sensing the rotational speed of the variable diameter pulley 8 and an output signal of the second speed sensor 14 as state quantity sensing means for sensing the rotational speed of the idler pulley 9. The rotational speed of the variable diameter pulley 8 is equal to the rotational speed of the engine, and the rotational speed of the idler pulley 9 corresponds to the traveling speed of the belt 2.

In a control operation performed by the controller 12, the rotational speed of the engine is determined on the basis of the output signal from the first speed sensor 13 and, when the rotational speed of the engine is lower than a certain level, the rotational speeds of the auxiliary systems are each set higher than the rotation speed of the engine by shifting the tensioner pulley into the first position. When the rotation speed of the engine is not lower than the certain level, the rotational speeds of the auxiliary systems are each set lower than the rotational speed of the engine by shifting the tensioner pulley into the second position. Further, the controller 12 determines the traveling speed of the belt 2 on the basis of the output signal from the second speed sensor 14, and adjusts the amount of shift the tensioner pulley 10 by means of the hydraulic cylinder 260 so that the ratio of the traveling speed of the belt to the rotation speed of the engine is kept at a certain level. The transmission ratio is liable to deviate from an initial level due to elongation of the belt 2 during prolonged use, but this arrangement prevents the deviation of the transmission ratio so as to maintain the transmission ratio at the initial level.

Figure 4:
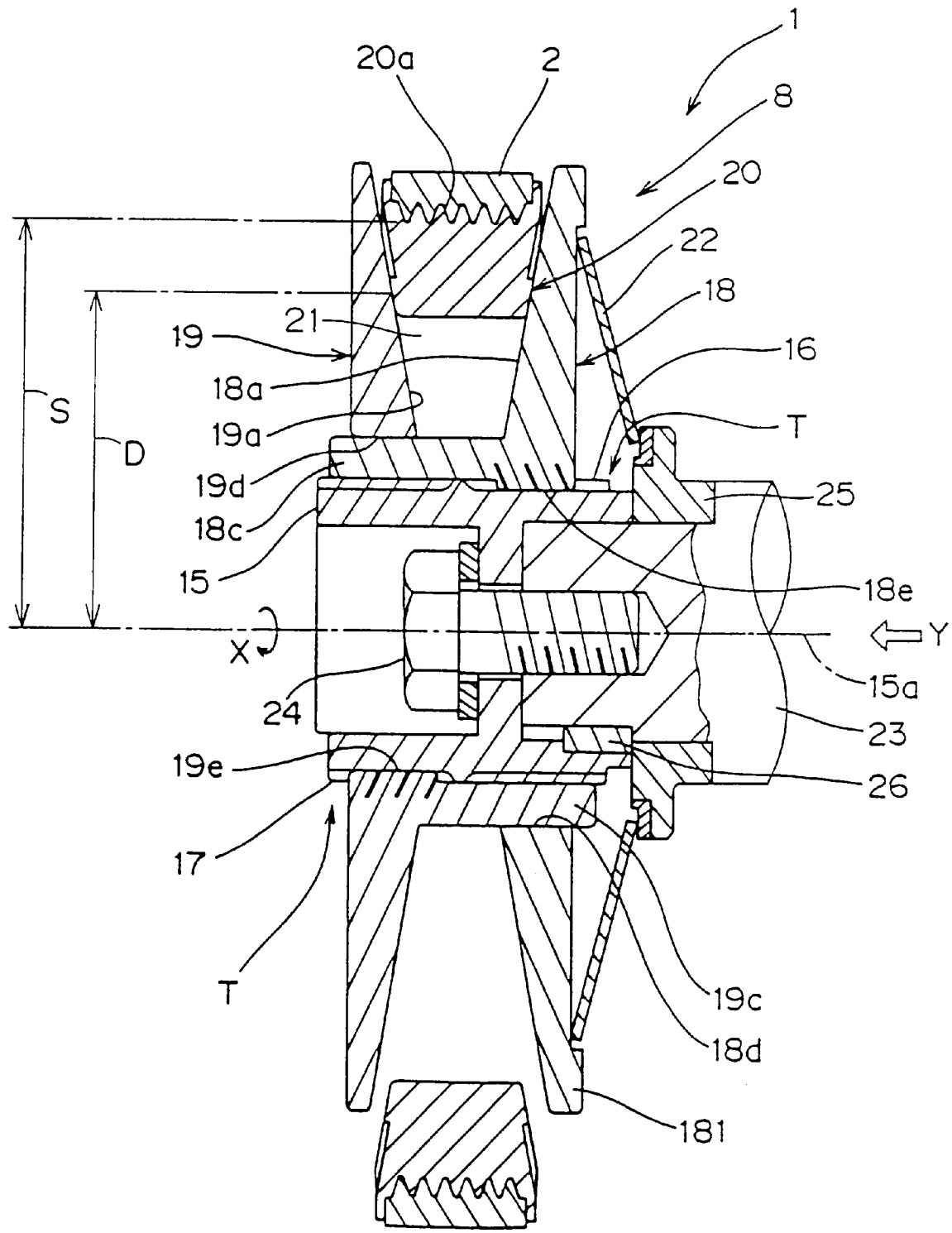
FIG. 4 is a vertical sectional view illustrating the variable diameter pulley which assumes a state where it has an intermediate contact radius between the maximum and minimum contact radii.

Referring to FIG. 1, the variable diameter pulley 8 includes as its major components: (1) a cylindrical rotation shaft 15 coaxially coupled to the crank shaft of the engine in a co-rotatable manner; (2) first and second pulley main bodies 18 and 19 coupled to the rotation shaft 15 in a co-rotatable manner in threaded engagement with first and second thread portions 16 and 17, respectively, which are formed at the same thread pitch in opposite thread directions on the periphery of the rotational shaft 15; (3) the power transmission ring 20 (also referred to as eccentric ring 20) as the power transmission member fitted in a V-shaped groove 21 defined between the pulley main bodies 18 and 19 in such a manner that the power transmission ring 20 is movable eccentrically with respect to an axis 15a of the rotation shaft 15 as shown in FIG. 4; and (4) an annular belleville spring 22 as the biasing means for biasing the first pulley main body 18 toward the pulley main body 19.

The inner circumference of the belleville spring 22 is supported by a support ring 25 fitted around the rotation shaft 15 so that the axial movement of the belleville spring is restricted.

The belt 2 is a flat belt having, for example, V-shaped ribs so that the inner circumference thereof has a sufficient contact area. The eccentric ring 20 is an annular member having a trapezoidal cross section, and has a transmission surface 20a formed on the outer circumference thereof for power transmission to the belt 2. The transmission surface 20a is formed with circumferential grooves which are engaged with the ribs of the belt 2.

The contact radius D is a distance between the axis 15a of the rotation shaft 15 and a radially middle portion of a region of either of the torque transmission faces 18a and 19a in contact with the corresponding lateral side face of the power transmission ring 20. The effective radius S is a distance between the axis 15a of the rotation shaft 15 and the inner circumference of the belt 2 located radially outwardly of the aforesaid contact region.

The cylindrical rotation shaft 15 is fixed to the crank shaft 23 by a bolt 24. A reference numeral 26 denotes a key for coupling the crank shaft 23 to the rotation shaft 15 in a co-rotatable manner. The first male thread portion 16 is located closer to the engine than the second male thread portion 17. When the rotation shaft 15 is rotated about the axis 15a thereof in the direction X indicated by an arrow as seen in FIG. 1, the first male thread portion 16 and the second male thread portion 17 serve as a right-hand thread (which is screwed into the first pulley main body 18 by rotating the shaft in a direction opposite to the direction X) and a left-hand thread (which is screwed into the second pulley main body 19 by rotating the shaft in the direction X), respectively, as seen along the direction Y indicated by an arrow which is parallel to the rotation shaft axis 15a.

Since the thread directions of the first and second male thread portions 16 and 17 are set as described above, the biasing force applied by the belleville spring 22 to bias the first pulley main body 18 in the direction Y causes the pulley main bodies 18 and 19 to rotate about the rotational shaft 15 in the direction opposite to the direction X thereby to be equidistantly moved toward each other. Conversely, when the pulley main bodies 18 and 19 are rotated about the rotation shaft 15 in the direction X, the pulley main bodies 18 and 19 are equidistantly moved away from each other (see FIGS. 1 and 4).

The pulley main bodies 18 and 19 have substantially the same shapes, except that the first pulley main body 18 has an annular projection 181 which is engaged with an outer circumference of the belleville spring 22.

Figure 5:
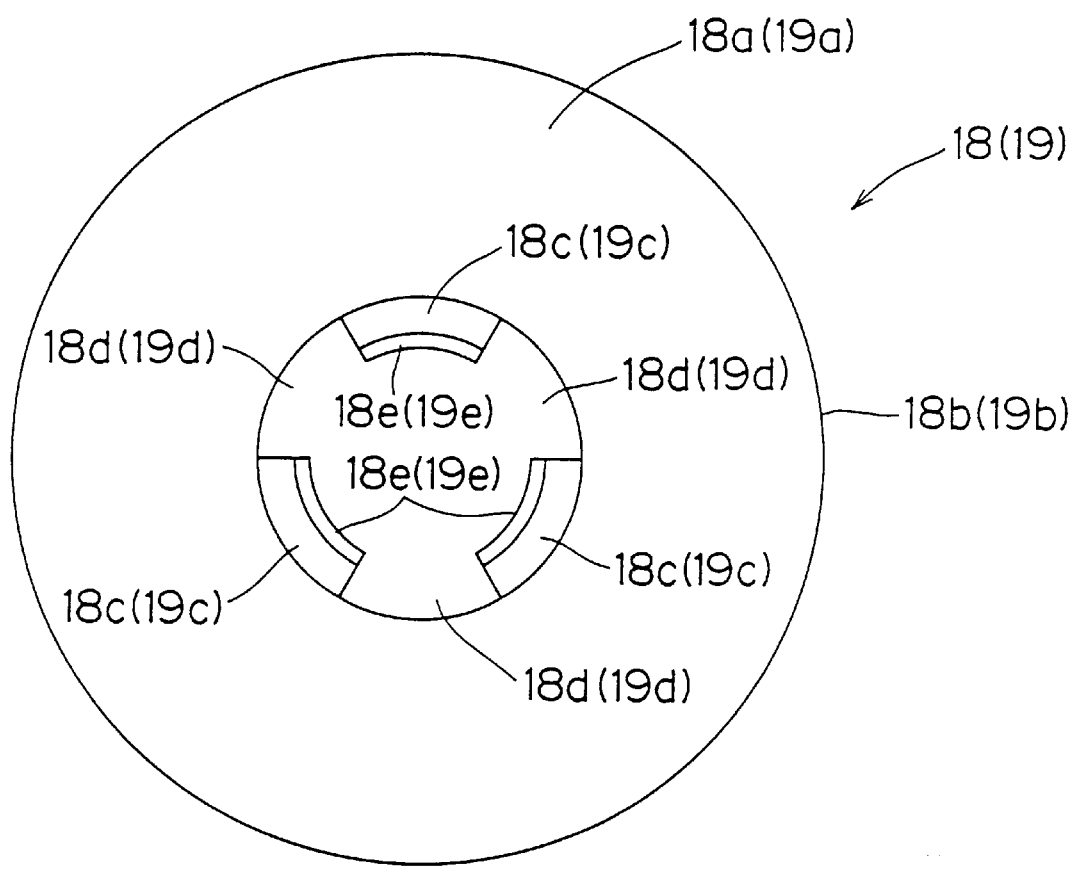
FIG. 5 is a front view of a pulley main body.

With reference to FIG. 1, and FIG. 5 (a front view of the pulley main body 18 (19)), the first pulley main body 18 has: (1) a main portion 18b of an annular plate having a tapered face 18a as the torque transmission face which defines the V-shaped groove 21; (2) a plurality of arcuate engagement projections 18c circumferentially equidistantly provided and axially projecting from the main portion 18b; (3) arcuate engagement grooves 18d formed between respective adjacent pairs of engagement projections 18c and opened inwardly of the annular main portion; and (4) a first female thread portion 18e formed on proximal portions of the engagement projections 18c on the inner circumference of the main portion 18b to be brought into engagement with the first male thread portion 16.

Similarly, the second pulley main body 19 has a main portion 19b having a tapered face 19a as the torque transmission face, a plurality of engagement projections 19c, engagement grooves 19d, and a second female thread portion 19e to be brought into engagement with the second male thread portion 17. The engagement projections 18c of the first pulley main body 18 are engaged with the engagement grooves 19d of the second pulley main body 19, while the engagement projections 19c of the second pulley main body 19 are engaged with the engagement grooves 18d of the first pulley main body 18.

The outer circumferential surfaces of the engagement projections 18c and 19c of the pulley main bodies 18 and 19 are loosely fitted to the inner surfaces of the engagement grooves 19d and 18d of the pulley main bodies 19 and 18. Thus, the pulley main bodies 18 and 19 are supported by each other in a rotatable and axially movable manner. The engagement projections 18c and 19c and the engagement grooves 18d and 19d constitute the first coupling means for coupling the pulley main bodies 18 and 19 to each other in a co-rotatable and relatively axially movable manner. Since the pulley main bodies 18 and 19 also serve as the first coupling means, the variable diameter pulley has a simplified construction with a reduced number of components.

A threadingly fixing mechanism comprised of the first male thread portion 16 and the first female thread portion 18e and a threadingly fixing mechanism comprised of the second male thread portion 17 and the second female thread portion 19e constitute the second coupling means. The threadingly fixing mechanisms each constitute conversion mechanism T (also referred to as torque cam mechanism T). Since the threadingly fixing mechanisms respectively include portions threaded in opposite thread directions, the pulley main bodies 18 and 19 are equidistantly moved toward and away from each other when the co-rotatable pulley main bodies 18 and 19 are rotated relatively about the rotation shaft 15. Therefore, the widthwise center line of the belt 2 is kept consistent even if the contact radius varies.

The torque cam mechanism T has the following meanings. Where the variable diameter pulley is employed as the driving pulley as in the embodiments of the present invention, the load torque exerts such a force as to cause a phase shift of the pulley main bodies 18 and 19 relative to the rotation shaft 15 in the direction opposite to the rotational direction of the rotation shaft 15 (in the direction opposite to the direction X). A force liable to cause the phase shift is converted into such a force as to move the pulley main bodies 18 and 19 toward each other by the torque cam mechanisms T comprised of the threadingly fixing mechanisms. This force is further converted into such a force as to move a portion of the eccentric ring 20 (as shown in FIG. 4) radially outwardly of the variable diameter pulley 8 via the tapered faces 18a and 19a.

When a torque fluctuation occurs, for example, due to the start of driving of an auxiliary system, a portion of the eccentric ring 20 in contact with the belt 2 is likely to forcibly increase the distance between the pulley main bodies 18 and 19, thereby to move radially inwardly of the variable diameter pulley 8. However, the radially inward movement of the power transmission ring 20 is prevented by the biasing force applied by the belleville spring 22 and the force which causes the eccentric ring 20 to be moved radially outwardly.

The conversion efficiency of converting the load torque into a force acting to move the eccentric ring 20 radially outwardly of the variable diameter pulley 8 can be adjusted by properly setting the inclination angles of the tapered faces 18*a* and 19*a*, the frictional coefficient of the eccentric ring 20 to the tapered faces 18*a* and 19*a*, and the thread efficiency of the threadingly fixing mechanisms of the torque cam mechanisms T, and the critical tension level of the belt 2 required for resisting the radially inward movement of the eccentric ring 20 can preliminarily be adjusted by the conversion efficiency. Therefore, the auto-tensioner 10 increases the tension of the belt to greater than the critical tension level to change the contact radius of the variable diameter pulley 8.

The thread efficiency can readily be adjusted by properly setting the thread lead angle of the thread portions (e.g., 45°)As the load torque increases, the force acting to move the pulley main bodies 18 and 19 toward each other is increased so that the eccentric ring 20 can more firmly be held therebetween. Therefore, slippage of the eccentric ring 20 between the pulley main bodies 18 and 19 can be prevented to eliminate a transmission loss as would be caused thereby.

In accordance with the first embodiment of the present invention, even if the fluctuation of the load torque occurs to exert a force to reduce the contact radius of the variable diameter pulley, a counterforce to this force is generated by the torque cam mechanisms T. Therefore, the variation in the contact radius of the variable diameter pulley 8, which may otherwise occur due to the fluctuation of the load torque can be prevented.

Since the counterforce can be generated in accordance to the magnitude of the load torque, the biasing force to be applied by the belleville spring 22 can be reduced. As a result, the friction loss due to the transmission torque can be reduced.

Further, the variable diameter pulley is designed such that the belt 2 is supported between the pair of annular pulley main bodies 18 and 19 and, therefore, the variable diameter pulley has a simplified construction and a smaller size in comparison with the conventional variable diameter pulley which employs a multiplicity of belt engagement bars. In addition, the variable diameter pulley has a reduced number of friction points in comparison with the conventional variable diameter pulley, so that the frictional resistance can be reduced. The reduction in the frictional resistance and the reduction in the friction loss due to the biasing force of the belleville spring 22 allow for smoother change of the rotational speed.

Second Embodiment

Figure 6:
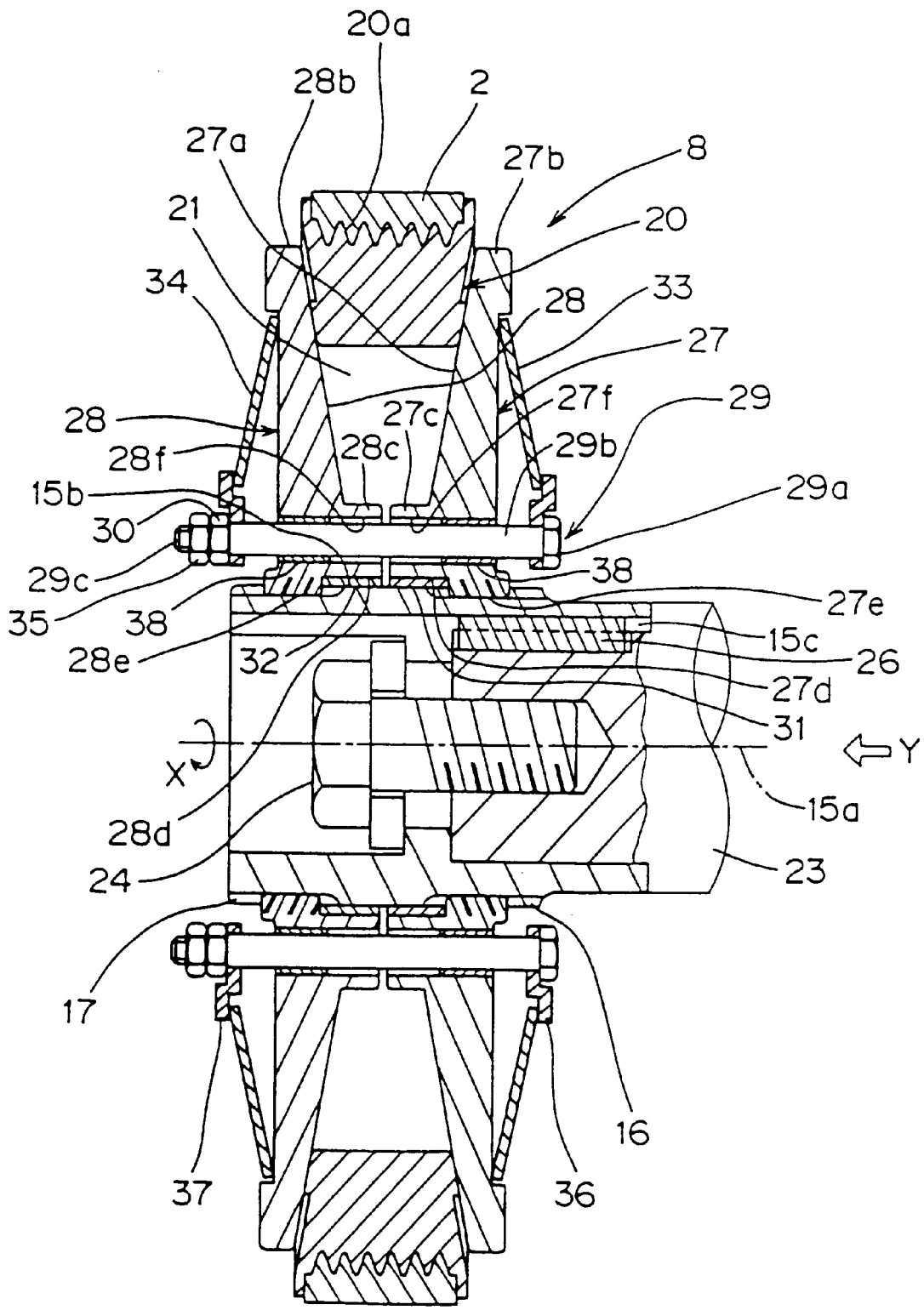
FIG. 6 is a vertical sectional view illustrating a variable diameter pulley according to a second embodiment of the present invention.
Figure 7:
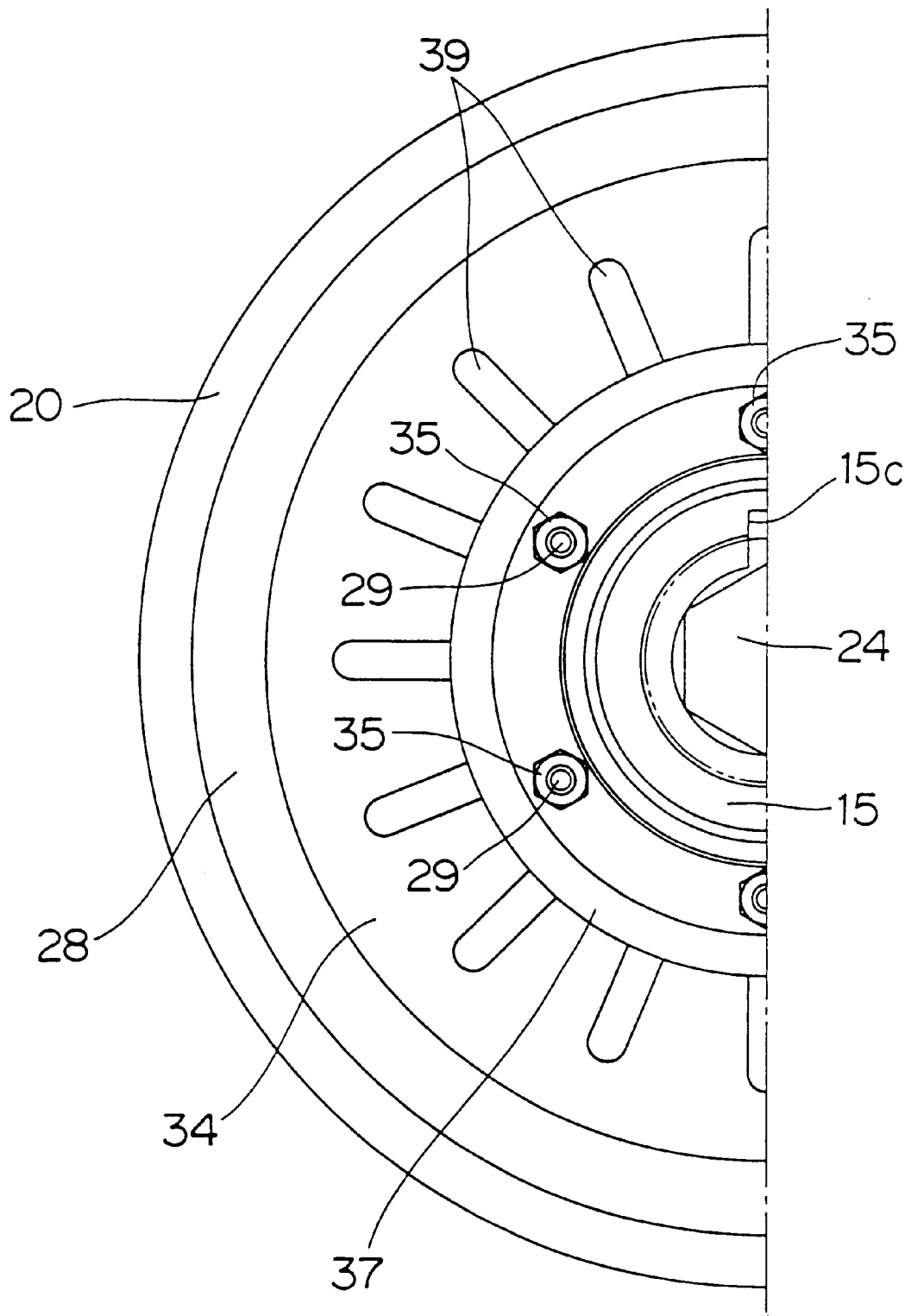
FIG. 7 is a side view of the variable diameter pulley shown in FIG. 6.

FIGS. 6 and 7 illustrate a second embodiment of the present invention. Referring to these figures, differences between this embodiment and the first embodiment are as follows:

(1) The first coupling means for coupling first and second pulley main bodies 27 and 28 to each other in a co-rotatable manner comprises a plurality of bolts 29 extending through the pulley main bodies 27 and 28 and nuts 30 fixed at distal ends of the respective bolts 29;

(2) The pulley main bodies 27 and 28 are supported around the rotation shaft 15 via bushes 31 and 32; and (3) A pair of belleville springs 33 and 34 are provided for biasing the pulley main bodies 27 and 28 toward each other.

The pulley main bodies 27 and 28 have the same shape but are disposed in different orientations. The first pulley main body 27 has: (1) a main portion 27*b* of an annular plate having a tapered face 27*a* as the torque transmission face which defines a V-shaped groove 21; (2) a cylindrical portion 27*c* extending from the inner circumference of the main portion 27*b* concentrically of the main portion 27*b*; (3) an engagement recess 27*d* formed in the inner circumference of the cylindrical portion 27*c* and press-fitted with the bush 31; (4) a first female thread portion 27*e* formed on the inner circumference of the cylindrical portion 27*c*; and (5) a plurality of bolt through-holes 27*f* formed circumferentially equidistantly in the cylindrical portion 27*c* and extending axially of the cylindrical portion 27*c* for receiving the respective bolts 29.

Similarly, the second pulley main body 28 has a main portion 28*b* having a tapered face 28*a* as the torque transmission face, a cylindrical portion 28*c*, an engagement recess 28*d*, a second female thread portion 28*e* and bolt through-holes 28*f*.

An outer circumferential portion of the rotation shaft 15 between the first and second male thread portions 16 and 17 defines a slide surface 15*b* which is to be brought into sliding contact with the bush 31.

The bolts 29 each have a head 29*a*, an elongated cylindrical shank portion 29*b* having no thread, and a thread portion 29*c*. The thread portion 29*c* is threaded with the aforesaid nut 30 and a lock nut 35. Support rings 36 and 37 for supporting the inner circumferential edges of the belleville springs 33 and 34 are rotatably engaged with the shank portions 29*b* of the bolts 29. Therefore, the support ring 25 employed in the first embodiment is not herein employed. Axial movement of one support ring 36 is restricted by the heads 29*a* of the bolts 29, while axial movement of the other support ring 37 is restricted by the nuts 30.

Bushes 38 for axially slidably supporting the shank portions 29*c* are press-fitted in the bolt through-holes 27*f* and 28*f* of the pulley main bodies 27 and 28. Reference numeral 15*c* denotes a keyway which receives a key 26 for key engagement of the rotation shaft 15 with the fixing member 24. In FIG. 6, reference numeral 39 denotes slits formed radially in the belleville springs 33 and 34 for imparting the belleville springs 33 and 34 with a greater flexibility. Since this embodiment has substantially the same construction as the first embodiment except the aforesaid points, the other components are denoted by the same reference numerals as in the first embodiment and will not be explained in detail.

In accordance with the second embodiment, the variation in the contact radius of the variable diameter pulley 8 due to the fluctuation of the load torque can be prevented as in the first embodiment. With the provision of the pair of annular pulley main bodies 27 and 28, the construction simplification and size reduction of the variable diameter pulley can be achieved. Further, the second embodiment provides various effects, allowing for smooth change of the rotation speed with a smaller friction loss.

Third Embodiment

FIGS. 8A and 8B illustrate major portions of a variable diameter pulley according to a third embodiment of the present invention. Referring to FIGS. 8A and 8B, differences between this embodiment and the embodiment shown in FIG. 1 are that torque transmission faces 40*a* and 41*a* of pulley main bodies 40 and 41 defining a V-shaped groove 50 therebetween each have an inwardly curved surface and that lateral side faces 42*b* of an eccentric ring 42 (to be brought into frictional engagement with the torque transmission face 40*a* and 41*a*) each have an outwardly curved surface. Reference numeral 42 denotes a transmission face for power transmission to the flat belt 2.

Figure 9:
FIG. 9 shows a relationship between the contact radius and the distance between pulley main bodies in the embodiment shown in FIGS. 8A and 8B.

In a state where the eccentric ring 42 exhibits the maximum contact radius (D=D1) as shown in FIG. 8A, contact points P1 located on a relatively radially outward side of the eccentric ring are brought into contact with the pulley main bodies 40 and 41. In a state where the eccentric ring 42 exhibits the minimum contact radius (D=D2) as shown in FIG. 8B, contact points P2 located on a relatively radially inward side of the eccentric ring are brought into contact with the pulley main bodies 40 and 41.

Where the contact surfaces of the pulley main bodies and the eccentric ring are linearly inclined as in the embodiments shown in FIGS. 1 and 6, the contact radius D cannot drastically be changed as indicated by a dot-and-dash line in FIG. 9. In this embodiment, however, the contact radius D (a distance between the axis of the pulley main bodies 40 and 41 and the contact point P1 or P2) can be changed progressively as the distance between the respective pulley main bodies 40 and 41 increases, as indicated by a solid line in FIG. 9. As a result, the transmission ratio can be set higher without increasing the sizes of the pulley main bodies 40 and 41. For example, the transmission ratio can be increased to 2 from 1.75 which is obtained where the torque transmission faces are linearly inclined surfaces.

In this embodiment, the change in the contact radius can be increased, because the contact points on the eccentric ring 42 can be shifted radially inwardly by a predetermined distance, i.e., from the contact positions P1 for the maximum contact radius (see FIG. 8A) to the contact positions P2 for the minimum contact radius (see FIG. 8B). In other words, this is because the eccentric ring can be shifted radially inwardly with respect to the pulley main bodies 40 and 41 to a greater extent. Where the pulley main bodies and the eccentric ring each have a linearly inclined surface, the contact points on the eccentric ring are kept consistent regardless of the change in the contact radius.

The inwardly curved surfaces of the torque transmission faces 40a and 41a may each have a curvature radius equivalent to or different from the curvature radius of the outwardly curved surfaces of the lateral side faces 42b of the eccentric ring 42. In either case, what is important is that the contact points on the eccentric ring 42 can be shifted. The inwardly and outwardly curved surfaces may each have two different curvature radii, but two curved surfaces having the different curvature radii should be connected without any step to eliminate a discontinuity (or a shock) which may be caused when the contact point moves across the boundary between the two surfaces. For the elimination of the discontinuity, it is preferred to employ a single curvature radius.

Fourth Embodiment

Figure 10:
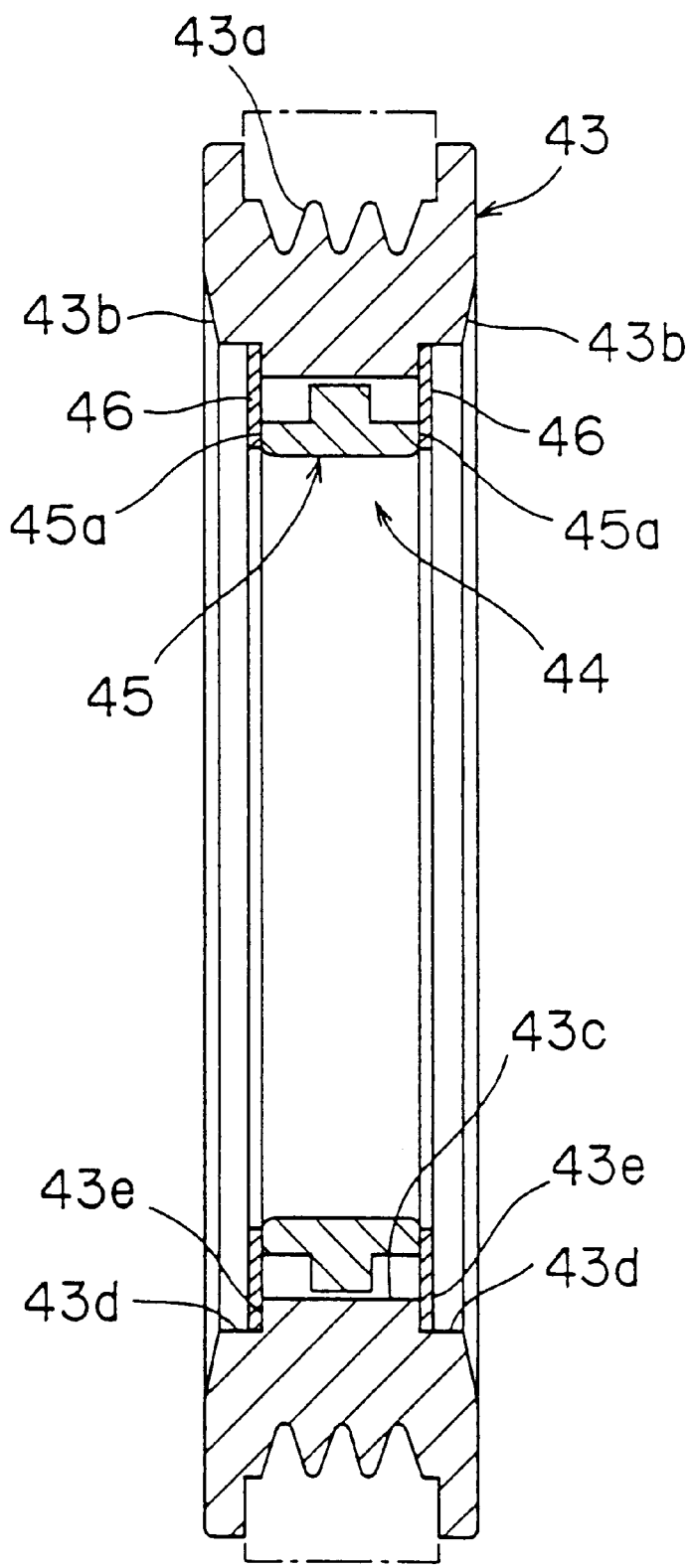
FIG. 10 is a sectional view illustrating a power transmission ring of a variable diameter pulley according to a fourth embodiment of the present invention.

FIG. 10 illustrates an eccentric ring of a variable diameter pulley according to a fourth embodiment of the present invention. In the fourth embodiment, an eccentric ring 43 which is different in the shape of the inner circumferential portion from the eccentric ring 42 of the embodiment shown in FIGS. 8A and 8B is fitted with a dynamic damper 44 for prevention of vibration of the eccentric ring 43. The inner circumferential portion of the eccentric ring 43 has a small diameter portion 43c and a pair of large diameter portions 43d at provided opposite sides of the small diameter portion. The dynamic damper 44 is coupled to step faces 43e connecting the small diameter portion 43c to the pair of large diameter portions 43d.

The dynamic damper 44 includes: (1) an annular member 45 as a weight member (also referred to as inertia member) disposed radially inwardly of the small diameter portion 43c of the eccentric ring 43 and having a predetermined mass; and (2) a pair of annular rubber plates 46 as the resilient member for resiliently supporting the annular member 45 by connecting side faces 45a of the annular member 45 to the corresponding step faces 43e.

The annular member 45 resiliently supported by the pair of rubber plates 46 vibrates parallel to the axis of the eccentric ring 43 while deforming the rubber plates 46. Thus, the vibration energy of the eccentric ring 43 is attenuated so that the amplitude of the vibration can drastically be reduced. When the eccentric ring 43 is off-center, only one of diametrically opposite sides of the eccentric ring 43 is supported by the pulley main bodies 40 and 41 with the other side thereof being free. Therefore, the eccentric ring 43 is liable to vibrate laterally. However, the provision of the dynamic damper 44 drastically reduces the amplitude of the vibration.

The dynamic damper is not limited to that having the aforesaid construction, but any of various known dynamic dampers having a weight member and a resilient member may be employed. For example, a so-called viscoelastic damper may be employed which has such a construction that a ball as the weight member is provided in a recess formed in the eccentric ring and the recess is filled with an oil or grease as the resilient member having a predetermined viscoelasticity and sealed.

Fifth Embodiment

With reference to FIGS. 11 to 20, an explanation will be given to a variable diameter pulley according to a fifth embodiment.

Figure 11:
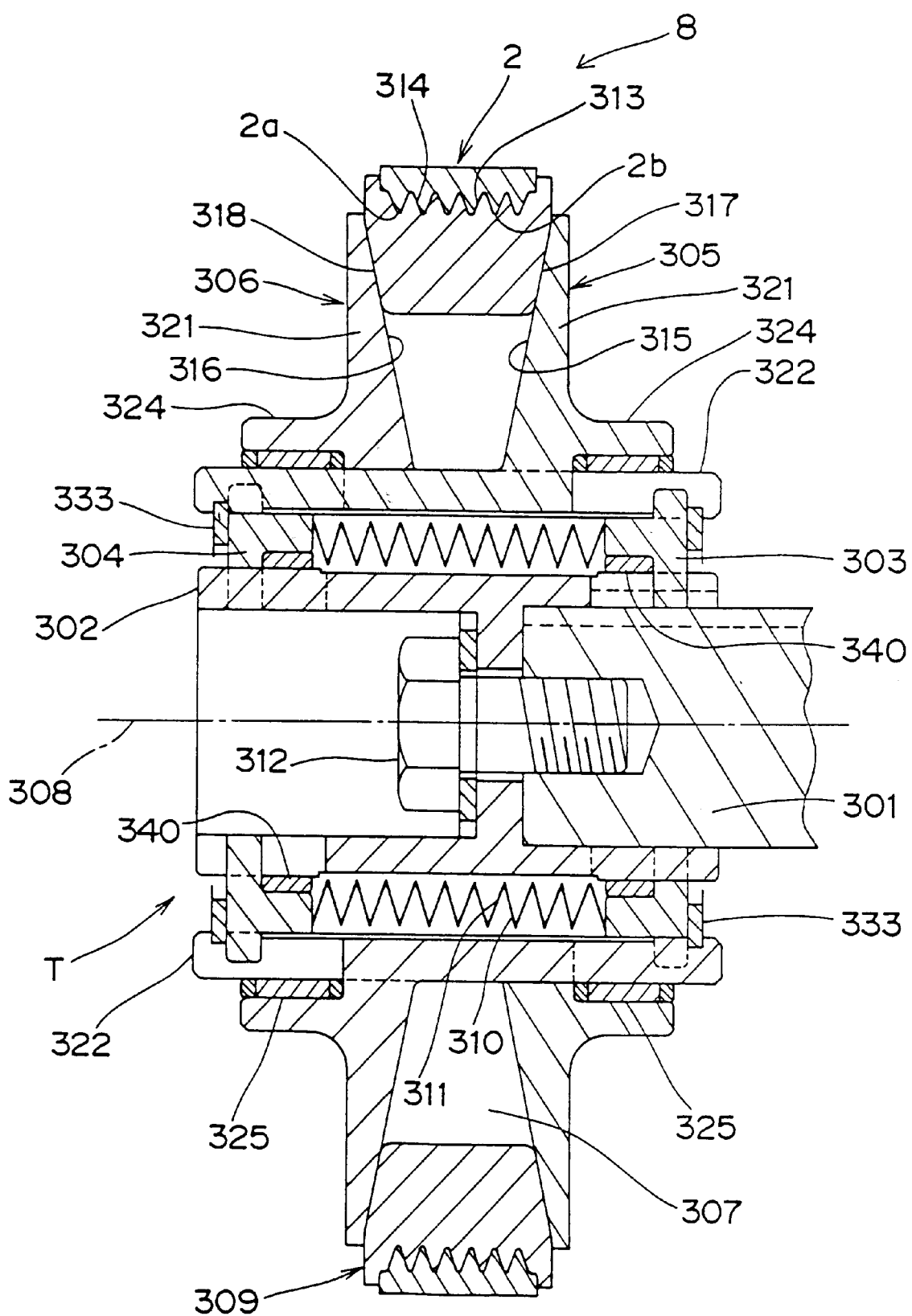
FIG. 11 is a vertical sectional view illustrating a variable diameter pulley according to a fifth embodiment of the present invention, which assumes a state where it has the maximum effective radius.
Figure 12:
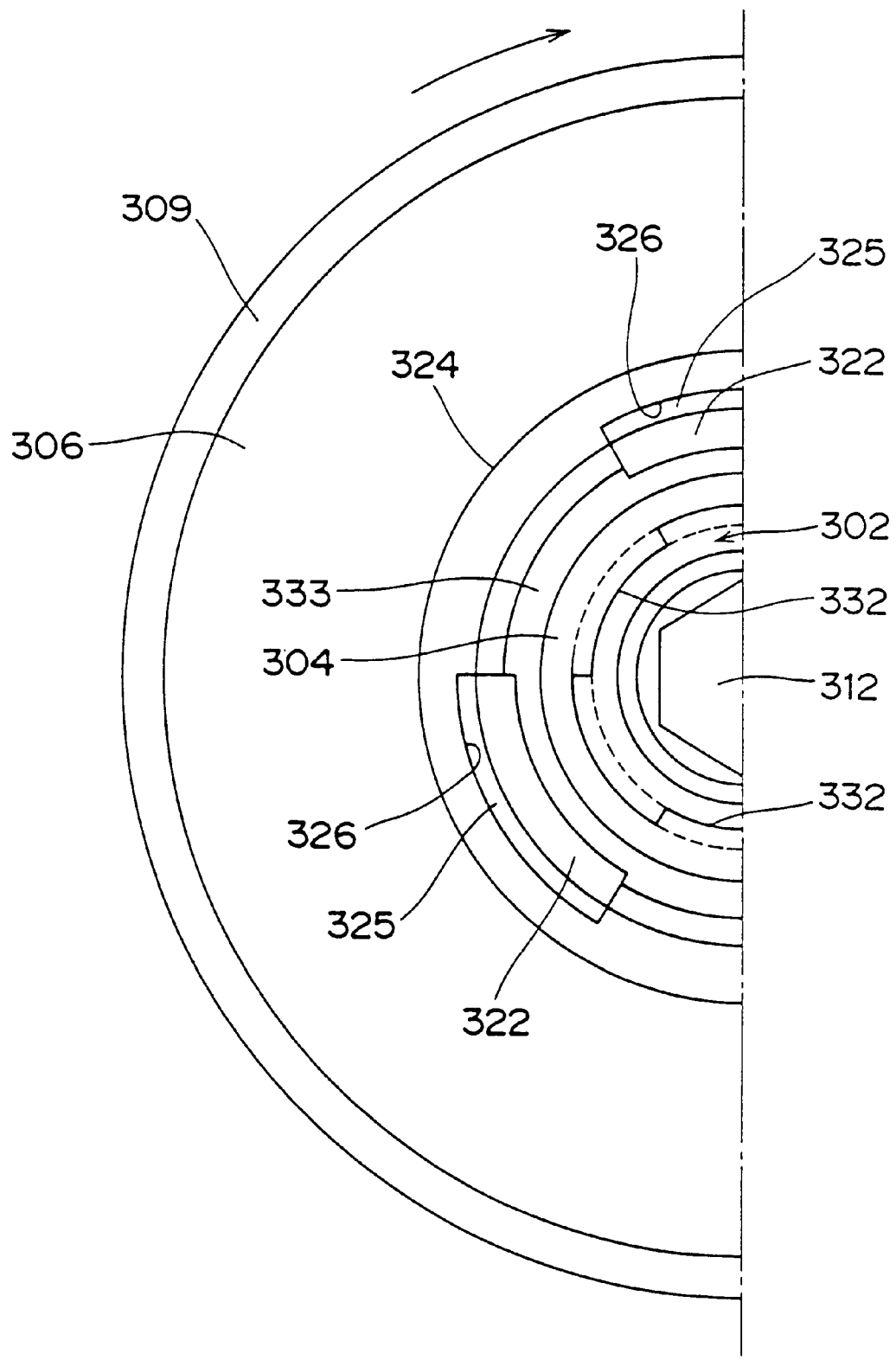
FIG. 12 is a half side view of the variable diameter pulley shown in FIG. 11.

Referring to FIG. 11, the variable diameter pulley 8 includes as its major components: (1) a cylindrical rotation shaft 302 coaxially coupled to a crank shaft 301 of an engine in a co-rotatable manner; (2) a pair of pulley main bodies 305 and 306 co-rotatably coupled to each other and further co-rotatably coupled to the rotation shaft 302 via a pair of coupling members 303 and 304; (3) a power transmission ring 309 fitted in a V-shaped groove 307 defined between the pulley main bodies 305 and 306 and adapted to be eccentrically movable with respect to an axis 308 of the rotation shaft 302; and (4) plural pairs of annular belleville springs 310 and 311 as the biasing means for biasing the respective pulley main bodies 305 and 306 toward each other via the coupling members 303 and 304.

The rotation shaft 302 is fixed to the crank shaft 301 by a bolt 312. The rotation shaft 302 and the crank shaft 301 rotate in unison.

A belt 2 is a flat belt such as a so-called V-ribbed belt having ridged (e.g., V-shaped) ribs 2b formed on the inner i circumferential surface 2a thereof and extending in the traveling direction so as to have a sufficient contact area. The power transmission ring 309 is an annular member having a trapezoidal cross section, and has a transmission surface 313 on the outer circumference thereof for power transmission to the belt 2. The transmission surface 313 is formed with circumferential grooves 314 which are engaged with the ribs 2b of the belt 2.

The V-shaped groove 307 is defined by opposed surfaces 315 and 316 of the pulley main bodies 305 and 306. Opposite peripheral side faces 317 and 318 of the power transmission ring 309 are kept in contact with the opposed surfaces 315 and 316, respectively, for power transmission.

Figure 13:
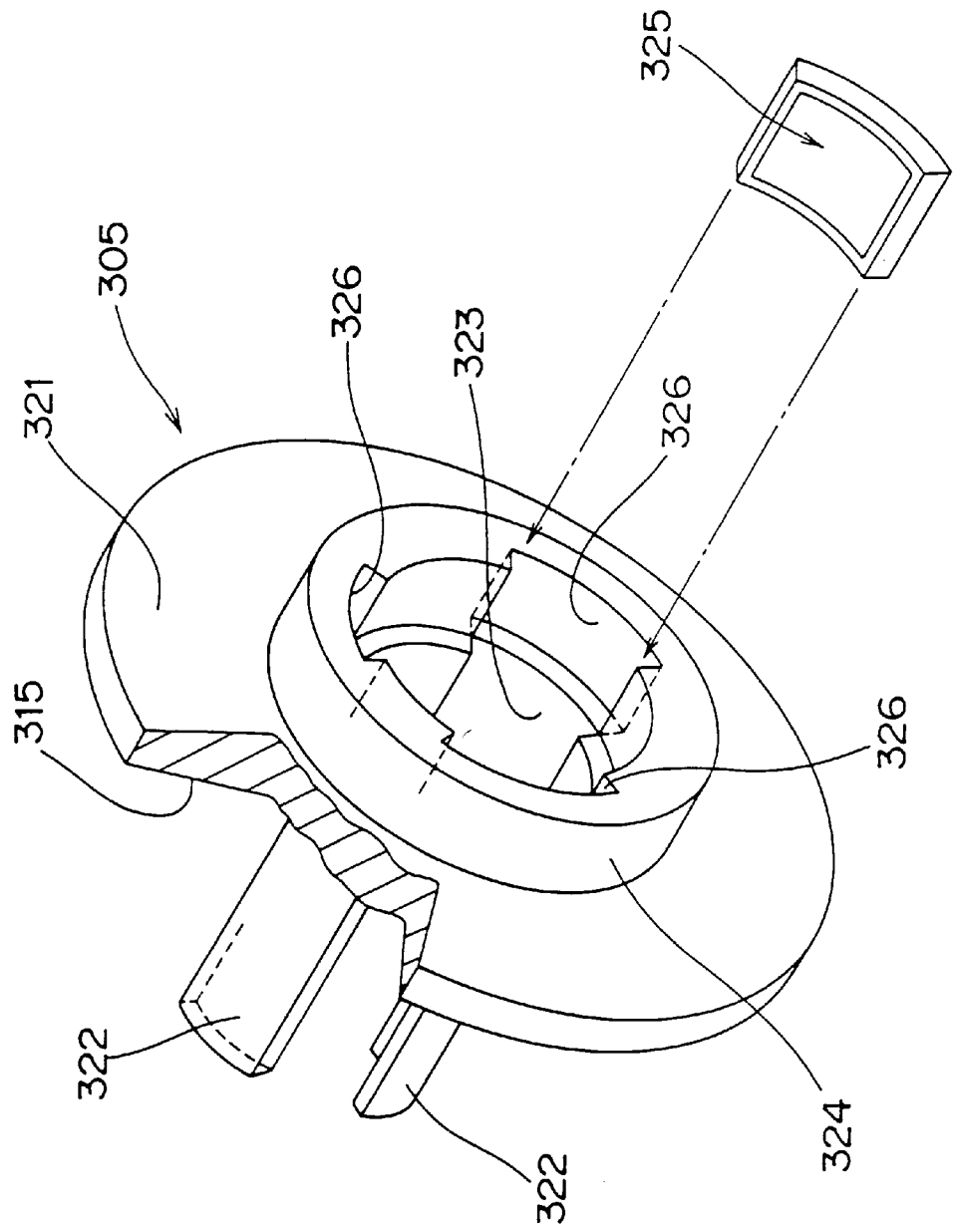
FIG. 13 is an exploded perspective view illustrating a pulley main body and a guide member of the variable diameter pulley shown in FIG. 11.
Figure 14:
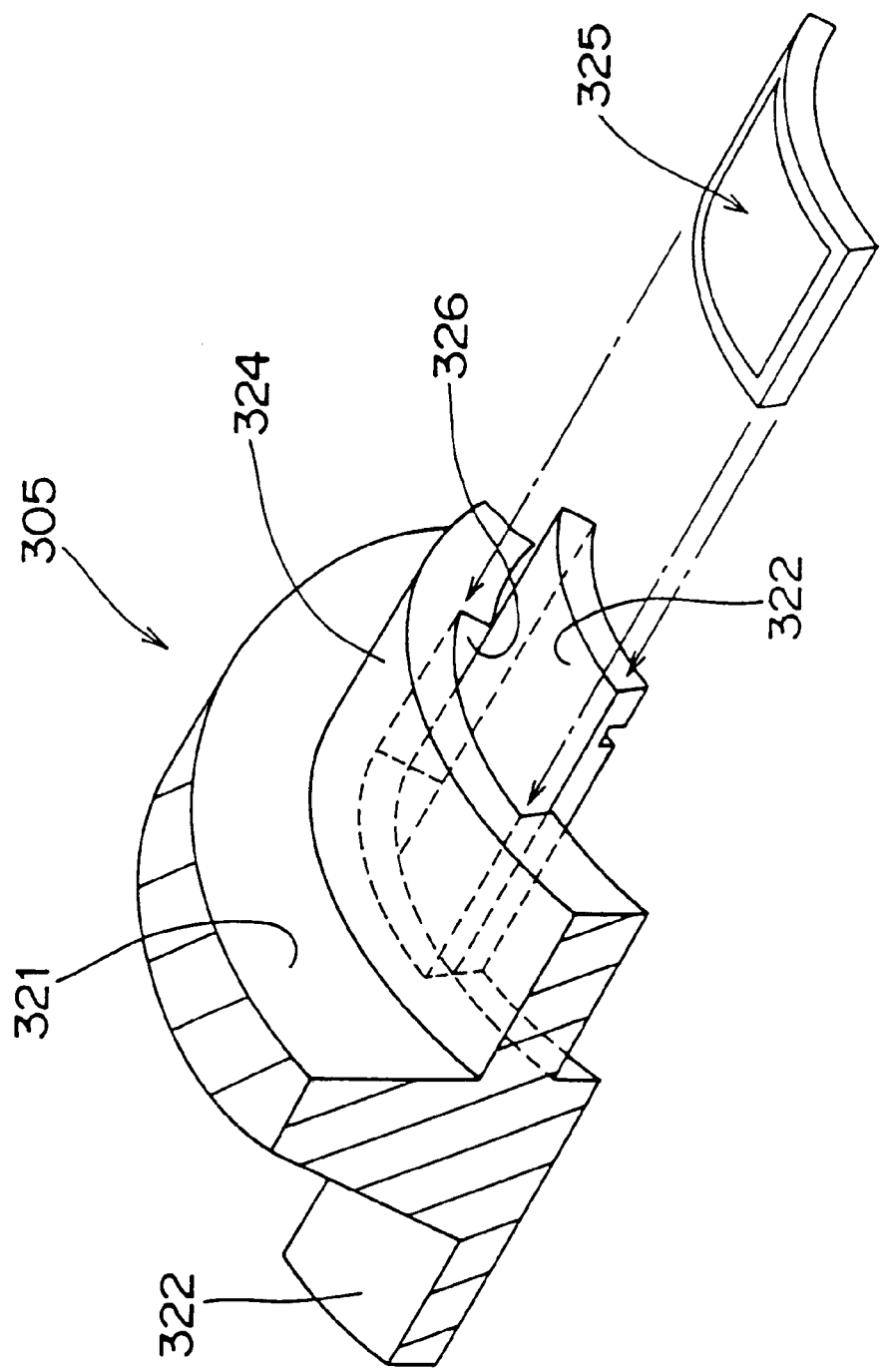
FIG. 14 is an exploded perspective view illustrating the guide member fitted on an outer circumferential surface of an engagement projection of the pulley main body in the variable diameter pulley of FIG. 11.

Referring to FIGS. 11 and 13, the pulley main body 305 has an annular main portion 321 having the tapered surface 315 for defining the V-shaped groove 307. A plurality of arcuate engagement projections 322 are circumferentially equidistantly provided on an inner circumferential portion of the main portion 321 to projected therefrom in one axial direction (toward the other pulley main body 306). The main portion 321 has a plurality of arcuate engagement grooves 323 circumferentially equidistantly formed between respective adjacent pairs of engagement projections 322 on the inner circumferential portion thereof. The main portion 321 further has a cylindrical portion 324 provided on a surface opposite to the surface 315. The pulley main bodies 305 and 306 respectively have laterally symmetrical shapes. Similarly to the pulley main body 305, the pulley main body 306 has a main portion 321, engagement projections 322 and a cylindrical portion 324.

Referring to FIGS. 11 through 14, a plurality of guide members 325 for guiding the pulley main bodies 305 and 306, for axial movement thereof relative to each other are provided on an inner circumferential surface of the cylindrical portion 324. These guide members 325 each have an arcuate shape and cover outer circumferential portions of the engagement projections 322 of the corresponding pulley main bodies 305 and 306. The guide members 325 are respectively fitted and retained in a plurality of arcuate retention grooves 326 circumferentially equidistantly formed in the inner circumferential surface of the cylindrical portion 324. As shown in FIG. 15, the guide members 325 each have a guide body 327 of an arcuate plate having a small friction coefficient, and a sealing member 328 such as of a rubber covering the periphery of the guide body 327.

A sleeve bearing such as a cylindrical bush could be employed instead of the guide members for guiding the pulley main bodies 305 and 306 for the axial movement thereof relative to each other, but there is a fear that a lubricant or grease filled in the bush may leak therefrom. In addition, since a portion to be brought into sliding contact with the bush does not necessarily extend along the entire length of the bush, the provision of the bush is not advantageous in space saving and strength. This is why the arcuate guide members 325 are provided in contact with the outer circumferential portions of the respective engagement projections 322 as shown in FIG. 16. Since the sealing members 328 respectively abut against the peripheral portions of the engagement projections 322 to prevent the lubricant or grease filled therein from leaking outside through the peripheral portions of the engagement projections 322 as shown by an arrow 329 in FIG. 16, the leakage of the lubricant and the like can assuredly be prevented.

Figure 17:
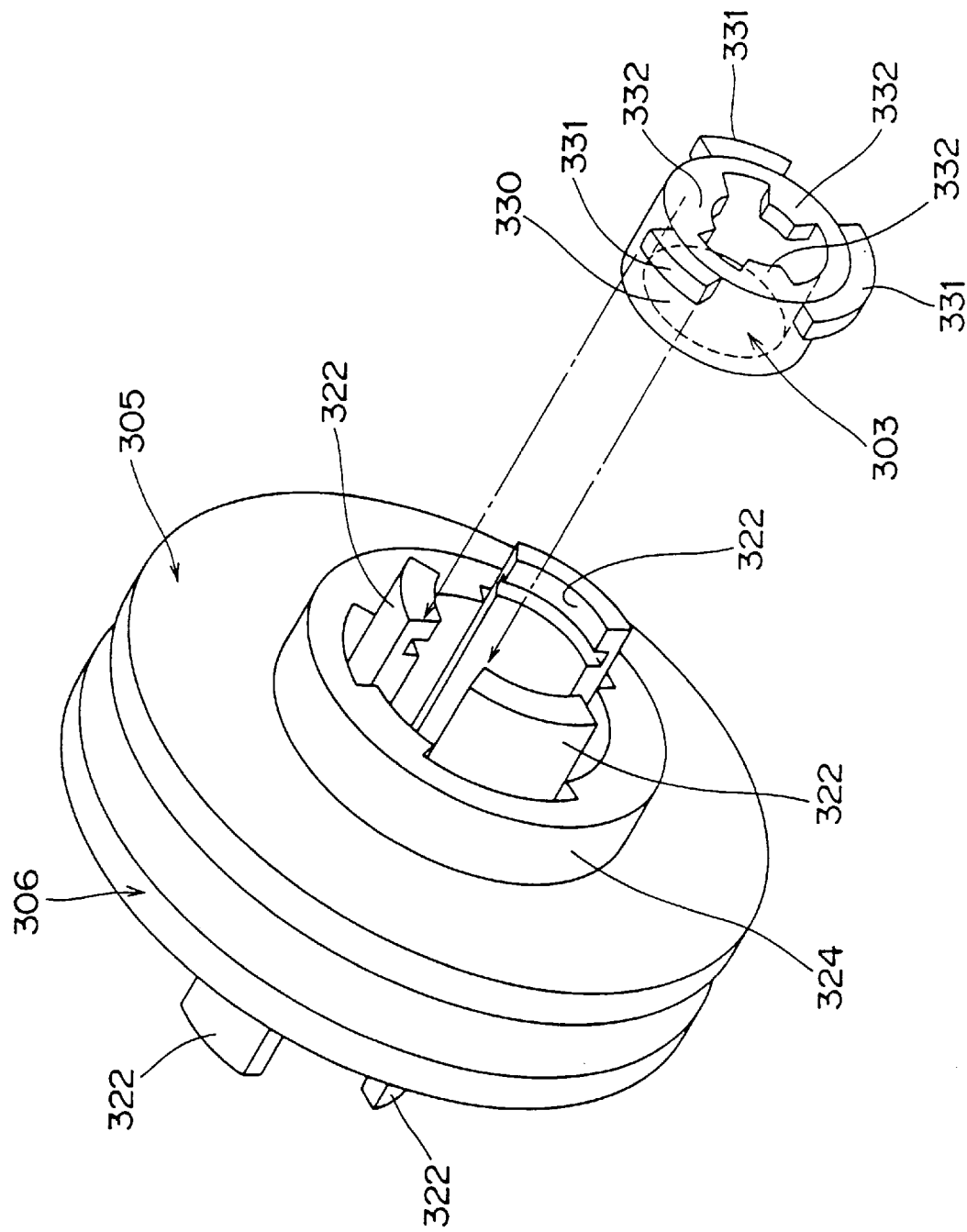
FIG. 17 is an exploded perspective view illustrating a state where the coupling member is to be combined with the preliminarily combined pulley bodies of the variable diameter pulley of FIG. 11.
Figure 18:
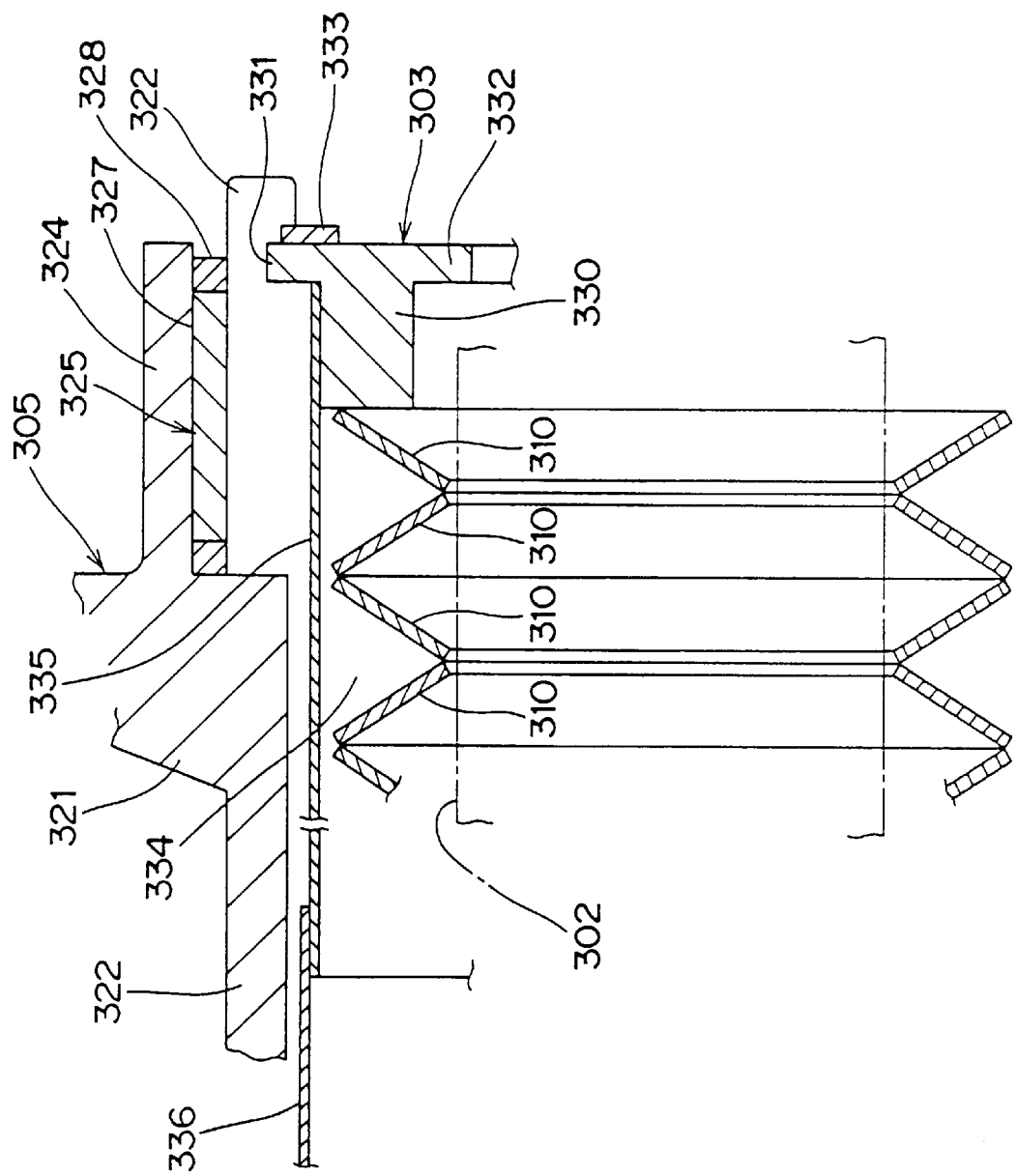
FIG. 18 is an enlarged sectional view illustrating an inner circumferential portion of the variable diameter pulley of FIG. 11.

As shown in FIG. 17, the engagement projections 322 of one of the pulley main bodies 305 and 306 extend through the engagement grooves 323 of the other pulley main body, so that the pulley main bodies 305 and 306 are kept in spline engagement with each other for co-rotation while being permitted to axially move relative to each other. That is, the engagement projections 322 of the pulley main bodies 305 and 306 serve as the portions extending from the opposed sides thereof in opposite directions through their counterpart pulley main bodies. The engagement projections 322 and the engagement grooves 323 constitute the first coupling means.

The left-hand pulley main body 306 as seen in FIG. 11 is in spline engagement with the right-hand coupling member 303 for co-rotation therewith. The right-hand pulley main body 305 as seen in FIG. 11 is in spline engagement with the left-hand coupling member 304 for co-rotation therewith. Referring to FIG. 17, more specifically, the coupling members 303 and 304 each have a plurality of engagement projections 331 circumferentially equidistantly provided on an outer circumferential portion of the cylindrical portion 330 at one end thereof. The spline engagement is achieved by meshing the engagement projections 331 with the engagement projections 332 of the corresponding pulley main bodies 305 and 306. The coupling members 303 and 304 are prevented from being axially withdrawn by stoppers 333 of snap rings respectively fixed to the inner circumferential portions of the engagement projections 332 of the pulley main bodies 305 and 306. The stoppers 333 are respectively fitted in grooves formed in the inner circumferential portions of the engagement projections 332 of the pulley main bodies 305 and 306.

Referring to FIG. 9, aforesaid plural pairs of annular belleville springs 310 and 310 are provided in a housing space 334 defined by the coupling members 303 and 304 between the outer circumferential surface of the rotation shaft 302 and the inner circumferential surfaces of the pulley main bodies 305 and 306. The annular belleville springs 310 and 311 are disposed coaxially with the rotation shaft 302. The outer boundary of the housing space 334 is defined by a pair of thin wall cylinders 335 and 336 serving as sealing members fitted on the outer circumferential surfaces of the coupling members 303 and 304. The thin wall cylinder 335 is fitted in the thin wall cylinder 336 in a slidably overlapping relation. Therefore, the amount of these thin wall cylinders can be varied as the coupling members 303 and 304 are axially moved relative to each other. The thin wall cylinders 335 and 336 are, for example, of a thin stainless plate.

Since the housing space 334 is surrounded by the thin wall cylinders 335 and 336, leakage of the lubricant or the like filled therein can assuredly be prevented. The provision of the aforesaid sealing members 328 further ensures the prevention of the leakage of the lubricant or the like.

The belleville springs 310 and 311 are arranged in an alternately inverted relation, so that the pulley main bodies 305 and 306 are biased away from each other via the coupling members 303 and 304. More specifically, the coupling members 303 and 304 are always pressed against the corresponding stoppers 333 by the belleville springs 310 and 311. Therefore, the coupling members 303 and 304 axially compress or decompress the belleville springs 310 and 311 to axially move the corresponding pulley main bodies 306 and 305 in unison. Accordingly, a change in the width of the V-shaped groove 307 defined between the pulley main bodies 305 and 306 is equated with the sum of the stroke amounts of the plurality of belleville springs 310 and 311.

Figure 19:
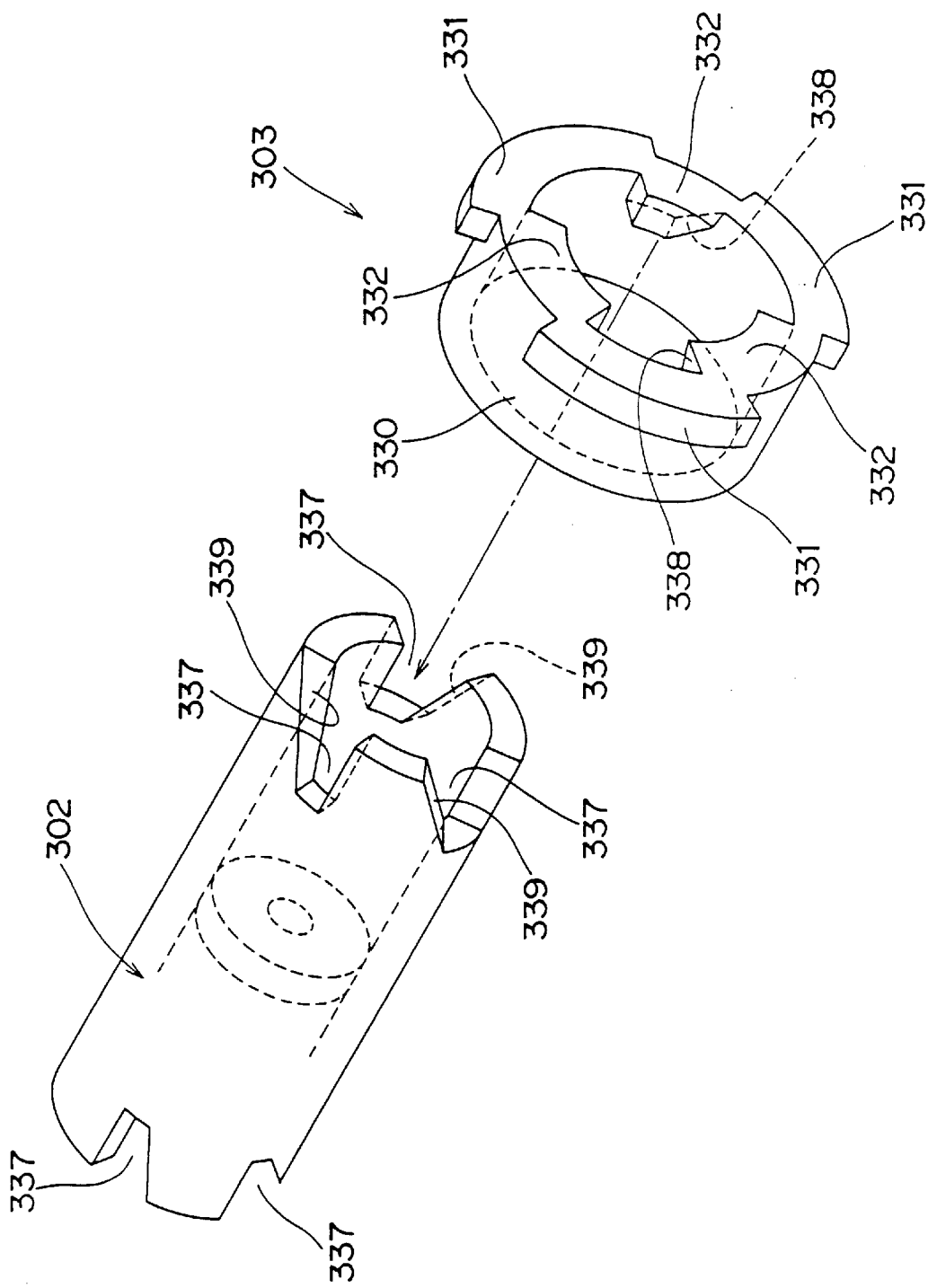
FIG. 19 is an exploded perspective view illustrating the coupling member and a rotation shaft of the variable diameter pulley of FIG. 11.

Referring to FIG. 11, the coupling members 303 and 304 are each rotatably supported on the outer circumferential surface of the rotation shaft 302 by a sleeve bearing 340 such as a metal bush. Further, the coupling members 303 and 304 are in cam engagement with the rotation shaft 302. Referring to FIG. 19, more specifically, the coupling members 303 and 304 each have a plurality of engagement projections 332 circumferentially equidistantly provided on the inner circumferential surface thereof. The engagement projections 332 are respectively fitted in a plurality of engagement grooves 337 circumferentially equidistantly formed in axially opposite end portions of the cylindrical rotation shaft 302.

The engagement projections 332 are respectively engaged with the engagement grooves 337 with slant cam faces 338 of the engagement projections 332 kept in contact with slant cam faces 339 of the engagement grooves 337. The inclination of each of the cam faces 338 of the coupling member 303 is angularly opposite to the inclination of each of the cam faces 338 of the coupling member 304 (similarly, the inclination of each of the cam faces 339 of one end of the rotation shaft 302 is angularly opposite to the inclination of each of the cam faces 339 of the other end of the rotation shaft 302). Therefore, if a phase shift between the coupling members 303 and 304 occurs with respect to the rotation shaft 302, the coupling members 303 and 304 are axially shifted by equal distances in opposite directions. As a result, the pulley main bodies 305 and 306 are equidistantly moved toward and away from each other.

The pairs of cam faces 338 and 339 coupling the rotation shaft 302 to the coupling members 303 and 304, respectively, constitute the torque cam mechanisms T. When the co-rotatable pulley main bodies 305 and 306 are rotated relative to the rotation shaft 302, the pulley main bodies 305 and 306 are axially equidistantly moved toward and away from each other by the torque cam mechanisms T. The coupling members 303 and 304 and the corresponding torque cam mechanisms T constitute the second coupling means.

Even if a fluctuation of the load torque applied to the variable diameter pulley 8 exerts a force to reduce the effective radius of the variable diameter pulley 8, a counterforce against this force is generated by the torque cam mechanisms T. Therefore, the variation in the effective radius of the variable diameter pulley 8 due to the fluctuation of the load torque can be prevented.

As the load torque becomes greater, the force to be applied to move the pulley main bodies 305 and 306 toward each other can be increased by the torque cam mechanisms T so that the power transmission ring 309 can be held more firmly between the pulley main bodies. Therefore, slippage of the power transmission ring 309 with respect to the pulley main bodies 305 and 306 is prevented, thereby eliminating a transmission loss due to the slippage.

Particularly, since the counterforce is generated in accordance with the magnitude of the load torque, the biasing force to be applied by the belleville springs 310 and 311 can be reduced. As a result, the friction loss of the transmission torque can be reduced.

The conversion efficiency of converting the load torque into the force acting to move the power transmission ring 309 radially outwardly of the variable diameter pulley 8 can be adjusted by properly setting the inclination angles of the tapered faces 315 and 316, the frictional coefficient of the power transmission ring 309 to the faces 315 and 316 and the transmission efficiency of the cam mechanisms of the torque cam mechanisms T, and the critical tension level of the belt 2 required for resisting the radially inward movement of the power transmission ring 309 can preliminarily be adjusted by the conversion efficiency. Therefore, the aforesaid tensioner pulley 10 increases the tension of the belt to greater than the critical tension level to change the effective radius of the variable diameter pulley 8. The transmission efficiency of the cam mechanisms can readily be adjusted by properly setting the inclination angles of the cam faces 338 and 339.

In accordance with the fifth embodiment, the belleville springs 310 and 311 as the resilient member are disposed in the housing space 334 located inwardly of the pulley main bodies 305 and 306 and, therefore, the size of the resilient member can be reduced in comparison with the case where the resilient member is provided on the lateral side of one of the pulley main bodies. Particularly, the belleville springs 310 and 310 as the resilient member are provided coaxially with the rotation shaft 302, so that the size of the resilient member can be further reduced for size reduction of the variable diameter pulley 8. Since the belleville springs are located inwardly of the pulley main bodies 305 and 306, the resilient member is less susceptible to invasion of dust, water and the like. Therefore, the aging of the belleville springs 310 and 311 can be prevented for improvement of durability thereof.

The outer boundary of the housing space 334 is defined by the pair of thin wall cylinders 335 and 336 fitted on the coupling members 303 and 304 and overlapping each other. Therefore, the aging of the belleville springs 310 and 311 due to invasion of water and the like can be prevented. Further, the leakage of the lubricant or the like filled in the cylinders can assuredly be prevented. The amount of overlap of the thin wall cylinders 335 and 336 can be varied by sliding the thin wall cylinders with respect to each other, while satisfactory sealing properties can be ensured without hindering the pulley main bodies 305 and 306 from axially moving relative to each other.

Further, the belleville springs 310 and 311 bias the pulley main bodies 305 and 306 via the coupling members 303 and 304 and, therefore, the pulley main bodies 305 and 306 are uniformly pressed with equal forces. As a result, the pulley main bodies 305 and 306 can hold the power transmission ring 309 with uniform forces.

Since the belleville springs 310 and 311 press the pulley main bodies 305 and 306, the sum of the shift of amounts of the pulley main bodies 305 and 306 can be equated with the sum of the stroke of the plurality of belleville springs 310 and 311. As a result, the total stroke amount can be doubled in comparison with the case where the resilient member presses one of the pulley main bodies from the lateral side thereof, so that the resilient force to be applied by the resilient member can be reduced to half. Therefore, the size of the resilient member can be further reduced for size reduction of the variable diameter pulley 8.

If a belleville spring was provided on the right side of the right pulley main body 305 as seen in FIG. 11, for example, the space where the belleville spring is disposed would be a dead space. In the fifth embodiment, however, the dead space can be eliminated. Where the variable diameter pulley is coupled to the crank shaft 301 of the engine as in this embodiment, a dynamic damper, for example, can be disposed in that space.

Where the variable diameter pulley 8 is employed, for example, as a driven pulley in the fifth embodiment, the inclination of the cam face of the torque cam mechanism T is such that a phase shift between the pulley main bodies 305 and 306 in the direction of the rotation of the rotation shaft 302 can be converted into movement of the pulley main bodies 305 and 306 toward each other. That is, the cam face of the torque cam mechanism T is inclined in a direction opposite to the rotation direction unlike the case where the variable diameter pulley is used as the driving pulley.

Further, the thread mechanism described in the embodiment shown in FIG. 1 may be used as the torque cam mechanism.

The present invention is not limited to the first to fifth embodiments described above, but various modifications may be made within the scope of the present invention.

For example, the dynamic damper of FIG. 10 according to the third embodiment may be applied to the eccentric rings described in the embodiments shown in FIGS. 1, 6 and 11.

Where the variable diameter pulley 8 is employed as a driven pulley in the embodiments shown in FIGS. 1, 6, 8A, 8B and 11, for example, the thread direction of the threadingly fixing mechanism of the torque cam mechanism is such that the phase shift between the pulley main bodies in the direction of the rotation of the rotation shaft 15 can be converted into movement of the pulley main bodies toward each other. That is, the thread direction of the threadingly fixing mechanism is opposite to the rotation direction, unlike the case where the variable diameter pulley is used as the driving pulley.

In the embodiments described above, a compression coil spring may be provided coaxially with the rotation shaft as the resilient member instead of the belleville springs.

Figure 21:
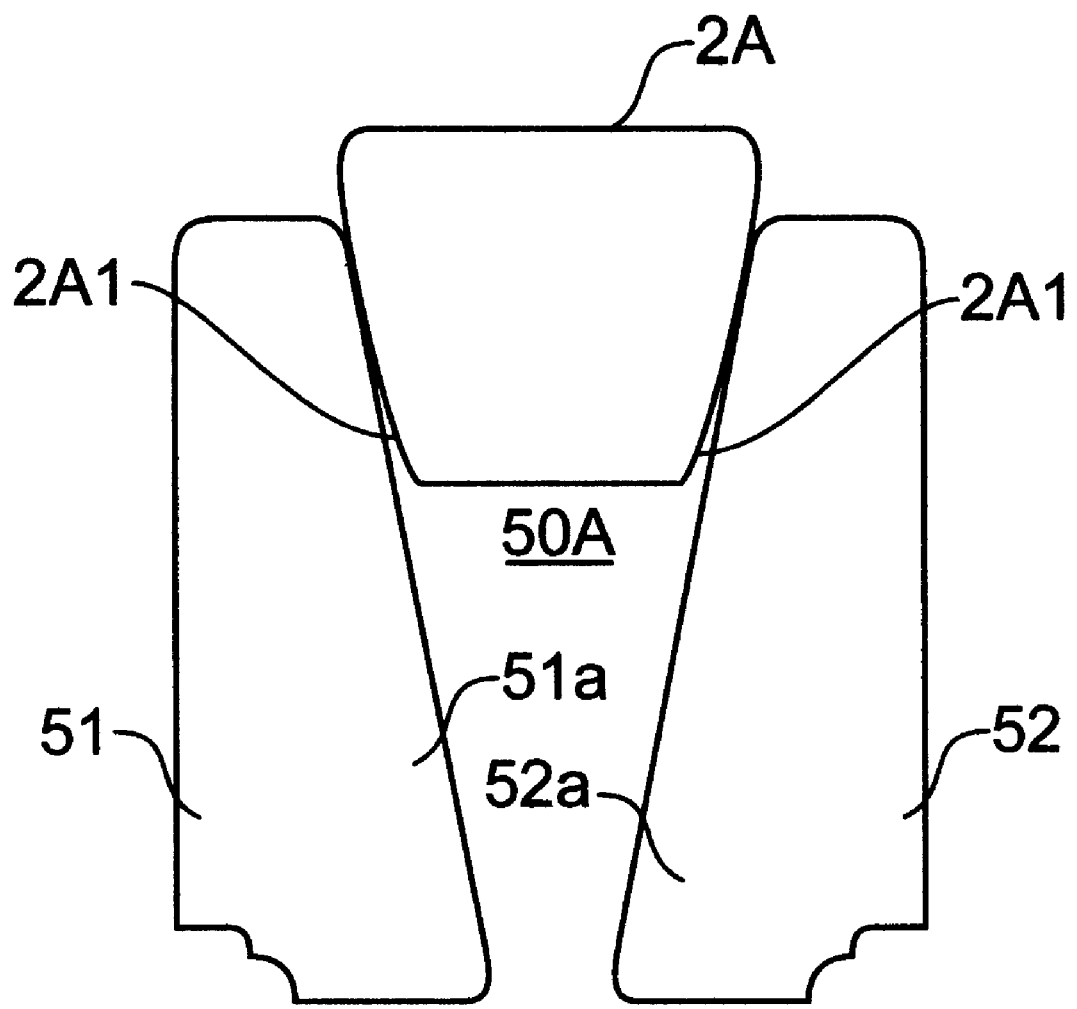
FIG. 21 is a schematic sectional view of a variable diameter pulley according to an alternative embodiment of the invention.

Further, in the embodiments shown in FIGS. 1, 6, 8A, 8B and 11, a V-shaped belt may be fitted directly in the V-shaped groove without the use of the eccentric ring. In such a case, as illustrated in FIG. 21, the torque transmission faces 51a, of the pulley main bodies 51, 52 exposed to the V-shaped groove 50A are inwardly curved as in the embodiment shown in FIGS. 8A and 8B, and the lateral side faces 2A, of the V-shaped belt 2A are outwardly curved. Thus, a variable diameter pulley having a reduced size and a greater transmission ratio can be provided.

The size reduction and durability improvement of the continuously variable transmission system 1 can be achieved by incorporating the variable diameter pulley 8 of any of the aforesaid embodiments having a smaller size and an improved durability.

What is claimed is:

1. A pulley with a variable effective radius with respect to a belt stretched therearound, the pulley comprising:

a rotation shaft;

a pair of annular pulley main bodies fitted around said rotation shaft for rotating with the shaft about an axis in a predetermined rotation direction, said main bodies having respective opposing tapered torque transmission faces, and defining, therebetween a retention groove for holding the belt;

first coupling means coupling the pair of pulley main bodies to each other in a co-rotatable manner while permitting the pair of pulley main bodies to synchronously move relative to each other in an axial direction;

biasing means biasing the pair of pulley main bodies toward each other; and a pair of second coupling means coupling the pair of pulley main bodies to the shaft for torque transmission thereto, the pair of second coupling means including a pair of conversion mechanisms converting rotational movements of the corresponding pulley main bodies relative to the shaft into axial movements of the corresponding pulley main bodies so as to move the pair of pulley main bodies synchronously toward each other by equal stroke amounts in cooperation with the first coupling means.

2. A pulley as set forth in claim 1, wherein the pair of conversion mechanisms each include a pair of cam faces which are brought into engagement with each other.

3. A pulley as set forth in claim 1, wherein the pair of conversion mechanisms include a pair of thread coupling mechanisms respectively having thread portions formed at the same thread pitch in opposite thread directions.

4. A pulley as set forth in claim 1, further comprising a circular transmission member about which the belt is supported, the transmission member being fitted in the groove so that the belt is indirectly held in the groove.

5. A pulley as set forth in claim 1, wherein the belt is directly fitted in the groove with the side faces of the belt in direct contact with the torque transmission faces of the main bodies.

6. A pulley as set forth in claim 1, wherein the first coupling means includes engagement projections and engagement recesses formed on the respective pulley main bodies, and the engagement projection and engagement recess formed on one of the pulley main bodies are respectively engaged with the engagement recess and engagement projection formed on the other pulley main body.

7. A pulley as set forth in claim 6, wherein the engagement projections are respectively loosely fitted in the engagement recesses so that the pair of the pulley main bodies can be supported by each other.

8. A pulley as set forth in claim 6, wherein receiving members each having an arcuate slide surface are respectively interposed between the engagement projection of the one pulley main body and the other pulley main body and between the engagement projection of the other pulley main body and the one pulley main body.

9. A pulley as set forth in claim 1, wherein the first coupling means includes a shaft member axially extending through the pair of pulley main bodies.

10. A pulley as set forth in claim 1, wherein the biasing means is a resilient member provided in a housing space defined between the shaft and the pair of pulley main bodies.

11. A pulley as set forth in claim 10, wherein the pair of pulley main bodies have portions extending to back sides of each other thereof in opposite directions, and the resilient member presses the oppositely extending portions away from each other to bias the pair of pulley main bodies toward each other.

12. A pulley as set forth in claim 11, wherein the oppositely extending portions are included in the first coupling means.

13. A pulley as set forth in claim 11, wherein the pair of second coupling means are respectively interposed between the shaft and the oppositely extending portions, and the resilient means biases the pair of pulley main bodies toward each other via the pair of second coupling means.

14. A pulley as set forth in claim 10, wherein an outer boundary of the housing space is defined by a cylindrical sealing member.

15. A pulley as set forth in claim 14, wherein the sealing member includes a pair of sealing members respectively movable in the axial direction along with the pulley main bodies, and having axially slidable overlap portions.

16. A pulley as set forth in claim 15, wherein the pair of sealing members are respectively supported by the pair of second coupling means.

17. A pulley as set forth in claim 10, wherein the pair of second coupling means respectively cover axially opposite end portions of the housing space.

18. A pulley as set forth in claim 10, wherein the resilient member includes a plurality of belleville springs arranged coaxially with the shaft in an alternately inverted relation.

19. A pulley with a variable effective radius with respect to a belt stretched therearound, the pulley comprising:

a rotation shaft;

a pair of annular pulley main bodies fitted around said rotation shaft for rotating with the shaft about an axis in a predetermined rotation direction, said main bodies having respective opposing tapered torque transmission faces, and defining therebetween a retention groove for holding the belt;

first coupling means-coupling the pair of pulley main bodies to each other in a co-rotatable manner while permitting the pair of pulley main bodies to axially move relative to each other;

biasing means biasing the pair of pulley main bodies toward each other;

a pair of second coupling means coupling the pair of pulley main bodies to the shaft for torque transmission thereto, the pair of second coupling means including a pair of conversion mechanisms converting rotational movements of the corresponding pulley main bodies relative to the shaft into axial movements of the corresponding pulley main bodies so as to move the pair of pulley main bodies toward each other by equal stroke amounts; and an annular power transmission member around which the belt is stretched, said transmission member being circular and being formed of resin;

wherein the power transmission member is held between the pair of torque transmission faces in a state where the power transmission member is movable eccentrically with respect to said axis, whereby a torque is transmitted between the belt and the pair of pulley main bodies via the power transmission member.

20. A pulley as set forth in claim 19, wherein the power transmission member has a trapezoidal cross section.

21. A pulley as set forth in claim 19, further comprising:

an inertia member movable relative to the power transmission member; and resilient support member for resiliently supporting the inertia member with respect to the power transmission member.

22. A pulley as set forth in claim 19, wherein the pair of torque transmission faces and a pair of faces to be brought into friction engagement therewith each include a curved surface.

23. A pulley as set forth in claim 19, wherein the torque transmission faces are each inwardly curved and the faces to be brought into friction engagement with the torque transmission faces are each outwardly curved, whereby the effective radius is progressively reduced as a distance between the pair of torque transmission faces increases.

* * * * *